(12) United States Patent
Washiro et al.

(10) Patent No.: US 9,669,722 B2
(45) Date of Patent: Jun. 6, 2017

(54) POWER SUPPLY DEVICE AND METHOD, AND PROGRAM

(75) Inventors: Takanori Washiro, Kanagawa (JP); Kazuyoshi Takemura, Tokyo (JP); Isao Soma, Saitama (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 14/117,138

(22) PCT Filed: May 1, 2012

(86) PCT No.: PCT/JP2012/061522
§ 371 (c)(1),
(2), (4) Date: Nov. 12, 2013

(87) PCT Pub. No.: WO2012/157444
PCT Pub. Date: Nov. 22, 2012

(65) Prior Publication Data
US 2015/0130296 A1    May 14, 2015

(30) Foreign Application Priority Data

May 16, 2011    (JP) ................................ 2011-109796

(51) Int. Cl.
*H01H 47/00*    (2006.01)
*B60L 11/18*    (2006.01)
(Continued)

(52) U.S. Cl.
CPC ......... *B60L 11/1848* (2013.01); *B60L 11/184* (2013.01); *B60L 11/185* (2013.01); *B60L 11/1816* (2013.01); *B60L 11/1825* (2013.01); *B60L 11/1844* (2013.01); *B60L 11/1846* (2013.01); *H02J 13/00* (2013.01); *H04B 3/548* (2013.01); *B60L 2230/16* (2013.01); *B60L 2250/16* (2013.01); *B60L 2270/32* (2013.01);
(Continued)

(58) Field of Classification Search
USPC ....................................................... 307/140
See application file for complete search history.

(56) References Cited

U.S. PATENT DOCUMENTS

2010/0001687 A1    1/2010  Watanabe
2014/0067660 A1 *  3/2014  Cornish ............... G06Q 20/145
                                                        705/39

FOREIGN PATENT DOCUMENTS

JP    2010-017007    1/2010
JP    2010-104209    5/2010
JP    2010-142096    6/2010

* cited by examiner

*Primary Examiner* — Rexford Barnie
*Assistant Examiner* — Dru Parries
(74) *Attorney, Agent, or Firm* — Chip Law Group

(57) ABSTRACT

The present technique relates to a power supply device and method as well as a program which can surely perform a billing process when a device is charged. When a vehicle ID registered in advance in an external storage matches a vehicle ID acquired by a reader/writer, a control unit makes a request to input, by operating a display unit formed of a touch panel, information which determines the amount of electric power to be charged. Once the information determining the amount of electric power to be charged has been input, the control unit controls a billing part to calculate the amount of electric power, so that a billing server performs a billing process on the amount of money corresponding to the amount of electric power. The control unit then controls a communication unit and turns on a selector switch.

10 Claims, 12 Drawing Sheets

(51) Int. Cl.
*H04B 3/54* (2006.01)
*H02J 13/00* (2006.01)

(52) U.S. Cl.
CPC ... *B60L 2270/34* (2013.01); *H04B 2203/5416* (2013.01); *H04B 2203/5445* (2013.01); *Y02E 60/721* (2013.01); *Y02T 10/7005* (2013.01); *Y02T 10/7088* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01); *Y10T 307/944* (2015.04)

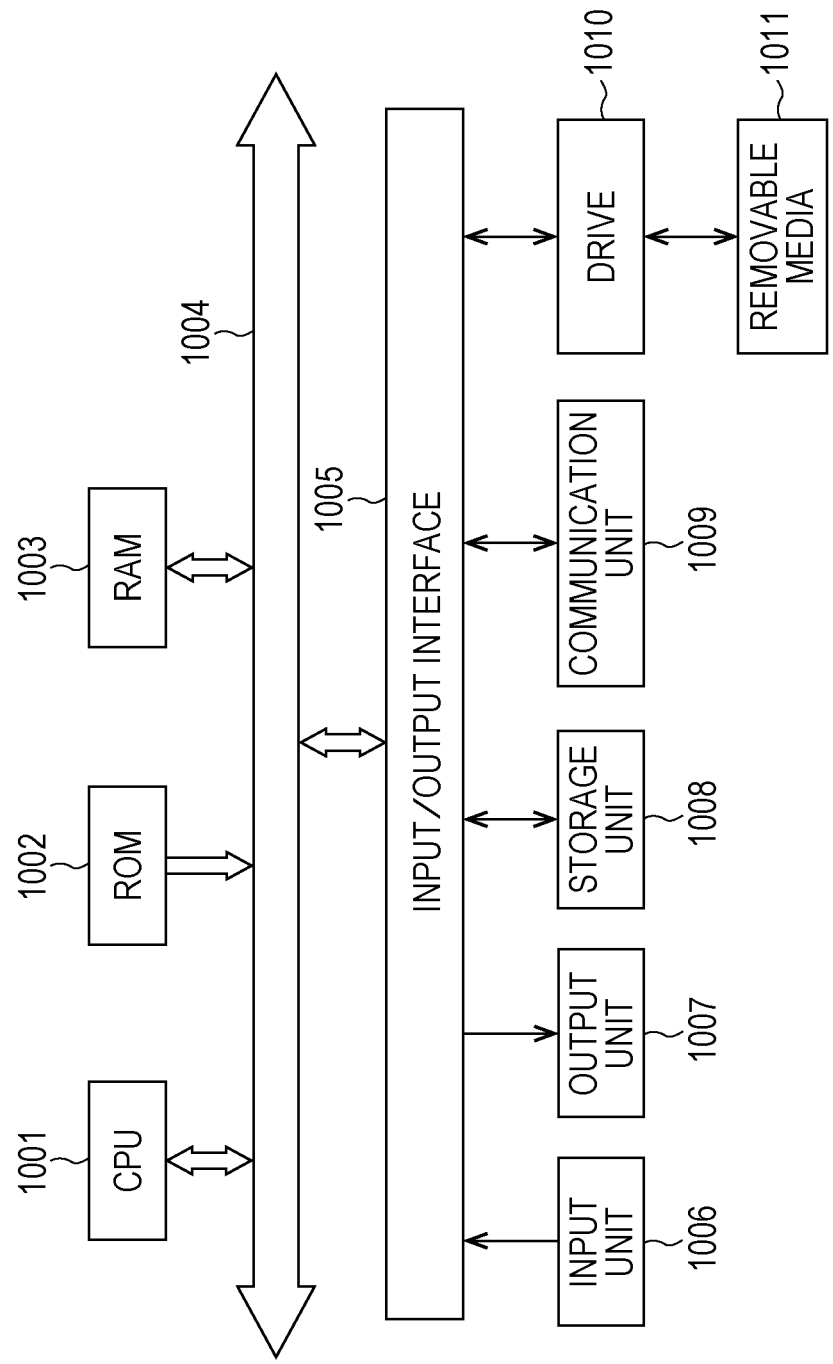

POWER SUPPLY DEVICE AND METHOD, AND PROGRAM

CROSS REFERENCES TO RELATED APPLICATIONS

The present application is a national stage of International Application No. PCT/JP2012/061522 filed on May 1, 2012 and claims priority to Japanese Patent Application No. 2011-109796 filed on May 16, 2011, the disclosure of which is incorporated herein by reference.

BACKGROUND

The present technique relates to a power supply device and method as well as a program, and particularly to a power supply device and method as well as a program which, in supplying electric power by using a power supply line, can supply electric power only to an electronic device owned by a specific user, who can then be billed surely.

An electric vehicle is becoming widespread as part of the environmental technology. It is imperative that an establishment supplying and selling electric power which powers the electric vehicle is made widely available in order to promote the widespread user of the electric vehicles. The establishment supplying and selling electric power is a facility similar to a gas station currently used but is a facility which charges, by supplying electric power, a battery that stores electric power being a power source of the electric vehicle.

Supplying and selling electric power requires a considerable amount of charging time to complete charging compared to selling fuel such as gasoline. Although an electric vehicle is ideally charged while parked in a parking lot, it is concerned that another electric vehicle is unduly charged while an owner of the electric vehicle leaves his/her electric vehicle in the middle of charging. In order to supply electric power to an electric vehicle and surely bill for the electric power supplied, it is required to at least be aware of which electric vehicle is connected to the power supply line supplying electric power to an electric vehicle.

As a technique to meet such requirement, there has been proposed a technique which specifies the type of electronic device connected to the power supply line by means of power supply line communication called PLC (Power Line Communication) (refer to Patent Document 1). This technique is applicable since an electric vehicle is a kind of electronic device.

CITATION LIST

Patent Document

Patent Document 1: JP 2003-110471 A

SUMMARY

Problems to be Solved by the Invention

However, the aforementioned PLC has been unable to supply electric power to only an electronic device owned by a specific user among electronic devices including an electric vehicle connected to the power supply line and to surely collect an electric power rate corresponding to the supplied amount of electric power from the user who owns the specific electronic device.

The present technique has been made in consideration of such circumstance and, in particular, allows electric power to be supplied to only an electronic device owned by a specific user in supplying electric power by using the power supply line and, at the same time, allows the specific user to be surely billed for an electric power rate corresponding to the electric power supplied.

Solutions to Problems

A power supply device according to a first aspect of the present invention includes: a switching unit which turns on/off electric power supplied to a device through a power supply line; a reader/writer unit which reads a device ID from a storage unit included in the device by means of load modulation using a high frequency signal through the power supply line, or writes information in the storage unit of the device; and a control unit which performs control to turn on the switching unit and supply electric power to the device through the power supply line when predetermined information has been written in the storage unit of the device by the reader/writer unit or when predetermined information in the storage unit of the device has been read by the reader/writer unit and written in an external storage.

A power supply device according to a second aspect of the present invention includes: a power supply unit which supplies electric power from a commercial power supply to a device through a power supply line; a switching unit which turns on/off electric power supplied from the power supply unit to the device through the power supply line; a reader/writer unit which reads a device ID from a storage unit of the device by means of load modulation using a high frequency signal through the power supply line, or writes information into the storage unit of the device; and a control unit which performs control to turn on the switching unit and supply electric power from the power supply unit to the device through the power supply line when predetermined information has been written in the storage unit of the device read by the reader/writer unit or when predetermined information in the storage unit of the device has been read by the reader/writer unit and written in an external storage.

The control unit may perform control to turn on the switching unit and supply electric power from the power supply unit to the device through the power supply line when billing information corresponding to the electric power supplied has been written in the storage unit of the device by the reader/writer unit or when information required for billing an amount of money corresponding to the electric power supplied has been read from the storage unit of the device by the reader/writer unit and written in the external storage.

The power supply device may further include a power measurement unit which measures an amount of electric power supplied to the device by the power supply unit, and the control unit may perform control to turn off the switching unit and discontinue supplying electric power from the power supply unit to the device through the power supply line when the power measurement unit has measured an amount of electric power corresponding to the billing information for the electric power supplied to the device, the billing information being written by the reader/writer unit.

The control unit may perform control to turn off the switching unit and discontinue supplying electric power from the power supply unit to the device through the power supply line when the device has become fully charged before supplying the amount of electric power corresponding to the billing information for the electric power supplied to the device by the power measurement unit, the billing information being written by the reader/writer unit.

The control unit may perform, at the time of turning off the switching unit and discontinuing the supply of electric power from the power supply unit to the device through the power supply line, a billing process in which the billing information corresponding to the amount of electric power supplied until the device is fully charged is subtracted from billing information that has already been billed so that a balance is refunded, when the device has become fully charged before supplying the amount of electric power corresponding to the billing information for the electric power supplied to the device by the power measurement unit, the billing information being written by the reader/writer unit.

The reader/writer unit may read, through an antenna connected to the device, the device ID stored in a storage medium in a non-contact manner by means of load modulation using the high frequency signal supplied through the power supply line, or write information into the storage medium.

The power supply device may further include an adapter which supplies electric power supplied through the power supply line to the device, wherein the reader/writer unit may read the device ID stored in a storage unit of the adapter connected to the device by means of load modulation using the high frequency signal that is supplied through the power supply line, or write information in to the storage unit of the adapter.

A power supply method according to the second aspect of the present invention includes: a power supply step in which electric power is supplied from a commercial power supply to a device through a power supply line by a power supply unit which supplies electric power from the commercial power supply to the device through the power supply line; a switching step in which electric power supplied to the device through the power supply line by the process performed in the power supply step is turned on/off by a switching unit which turns on/off electric power supplied from the power supply unit to the device through the power supply line; a read/write step in which a device ID is read from a storage unit of the device by means of load modulation using a high frequency signal through the power supply line or information is written into the storage unit of the device by a reader/writer unit which reads the device ID from the storage unit of the device by means of load modulation using the high frequency signal through the power supply line or writes the information into the storage unit of the device; and a control step in which control is performed to turn on the process performed in the switching step and supply electric power to the device through the power supply line by the process performed in the power supply step when predetermined information has been written in the device read by the process performed in the read/write step or when predetermined information having been read from the device has been written in an external storage by the process performed in the read/write step, the control step being performed by a control unit which performs control to turn on the switching unit and supply electric power from the power supply unit to the device through the power supply line when the predetermined information has been written in the device read by the reader/writer unit or when the predetermined information having been read from the device has been written in the external storage by the reader/writer unit.

A program according to the second aspect of the present invention causes a computer to include a step including: a power supply step in which a power supply unit supplies electric power from a commercial power supply to a device through a power supply line; a switching step in which a switching unit turns on/off electric power supplied to the device through the power supply line by the process performed in the power supply step; a read/write step in which a reader/writer unit reads a device ID from a storage unit of the device by means of load modulation using a high frequency signal through the power supply line or writes information into the storage unit of the device; and a control step in which a control unit performs control to turn on the process performed in the switching step and supply electric power to the device through the power supply line by the process performed in the power supply step when predetermined information has been written in the device read by the process performed in the read/write step or when predetermined information having been read from the device has been written in an external storage by the process performed in the read/write step, wherein the computer controls a power supply device including: the power supply unit which supplies electric power from the commercial power supply to the device through the power supply line; the switching unit which turns on/off electric power supplied from the power supply unit to the device through the power supply line; the reader/writer unit which reads the device ID from the storage unit of the device by means of load modulation using the high frequency signal through the power supply line or writes the information into the storage unit of the device; and the control unit which performs control to turn on the switching unit and supply electric power from the power supply unit to the device through the power supply line when the predetermined information has been written in the device read by the reader/writer unit or when the predetermined information having been read from the device has been written in the external storage by the reader/writer unit.

The first aspect of the present invention is provided such that: electric power supplied to the device through the power supply line is turned on or off; the device ID is read from the storage unit of the device by means of load modulation using the high frequency signal through the power supply line, or information is written in the storage unit of the device; and the power supply device performs control to turn on the electric power supply and supply the electric power to the device through the power supply line when the predetermined information has been written in the storage unit of the device or when the predetermined information having been read from the device by the reader/writer unit has been written in the external storage.

The second aspect of the present invention is provided such that: electric power is supplied from the commercial power supply to the device through the power supply line; the electric power supplied to the device through the power supply line is turned on or off; the device ID is read from the storage unit of the device by means of load modulation using the high frequency signal through the power supply line, or the information is written in the storage unit of the device; and the power supply device performs control to turn on the electric power supply and supply the electric power to the device through the power supply line when the predetermined information having been read has been written in the storage unit of the device or when the predetermined information having been read from the device by the reader/writer unit has been written in the external storage.

The power supply device according to the present technique may be a stand-alone device or a block performing a power supply process.

Effects of the Invention

According to the present technique, the electric power can be supplied only to an electronic device owned by a specific user, who can be surely billed for an electric power rate corresponding to the electric power supplied.

Additional features and advantages are described herein, and will be apparent from the following Detailed Description and the figures.

BRIEF DESCRIPTION OF THE FIGURES

FIG. 12 is a diagram illustrating a configuration example of a general-purpose personal computer.

DETAILED DESCRIPTION

Modes for carrying out the invention (hereinafter referred to as embodiments) will now be described in the following order.

1. First embodiment (power supply system in which electric power rate is billed in advance)

2. Second embodiment (power supply system in which electric power rate is billed after charging)

3. First variation (power supply system in which non-contact ID card is used)

4. Second variation (power supply system in which plug adapter is used)

1. First Embodiment

Power Supply System

Figure 1:
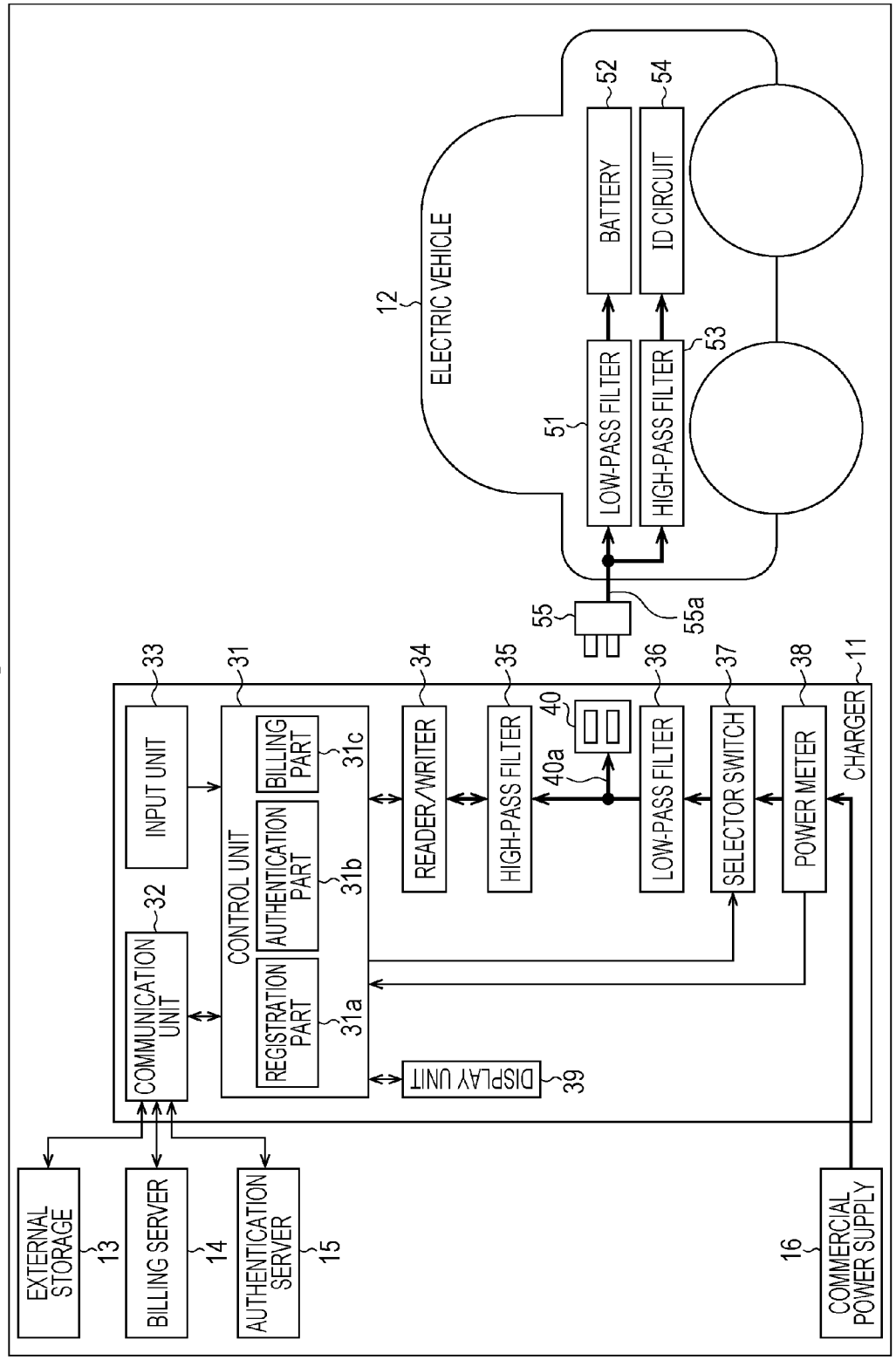
FIG. 1 is a block diagram illustrating a configuration example of a first embodiment of a power supply system applying the present technique.

FIG. 1 illustrates a configuration example of a first embodiment of hardware in a power supply system in which a power supply device being the present technique is applied. An image supply system illustrated in FIG. 1 includes a charger 11 as the power supply device and an electric vehicle 12 as an electronic device.

The charger 11 of the power supply system is provided at an apartment, for example, where a resident of the apartment registers the electric vehicle 12 he/she owns by using a resident certificate only possessed by the resident so that electric power is supplied only to the registered electric vehicle to charge a battery.

The charger 11 includes a control unit 31, a communication unit 32, an input unit 33, a reader/writer 34, a high-pass filter 35, a low-pass filter 36, a selector switch 37, a power meter 38, a display unit 39, and an outlet 40.

The control unit 31 is configured by a microcomputer or the like to control the overall operation of the charger 11. The control unit 31 includes a registration part 31a, an authentication part 31b, and a billing part 31c. The registration part 31a registers the electric vehicle 12 owned by the resident of the apartment by registering the resident certificate of the apartment including a barcode or a QR (Quick Response) code (registered trademark) input to the input unit 33 in association with a vehicle ID (Identification) that is read by the reader/writer 34 and used to identify the electric vehicle 12, into an external storage 13 formed of a hard disk or the like or in an authentication server 15 formed of a server computer connected to a network. The authentication part 31b performs an authentication process by verifying the vehicle ID read by the reader/writer 34 and used to identify the electric vehicle 12 against the vehicle ID registered in the external storage 13 or the authentication server 15 by the registration part 31a. The billing part 31c controls the communication unit 32 and performs a billing process on a billing server 14 on the basis of credit card information or prepaid card information that is input through the input unit 33 formed of a card reader or the like, or payment information from the input unit 33 which accepts paper money and coins inserted therein.

The communication unit 32 formed of an Ethernet (registered trademark) card or the like communicates with the external storage 13, the billing server 14, and the authentication server 15 connected to the communication unit via a network and transmits/receives various data or programs.

The input unit 33 reads information as a code reader and supplies the information to the control unit 31 when the resident certificate includes the bar code or the QR code (registered trademark) as described above. The input unit 33 further accepts input of information on a credit card or a prepaid card formed of a magnetic card or the like and supplies the information to the control unit 31. Furthermore, the input unit 33 accepts paper money and coins, for example, to determine the authenticity thereof, read the amount, and supply the information to the control unit 31. Note that the input unit 33 may have a configuration of the reader/writer 34 to be described in order to accept various certificates, cash or a credit card, read billing information stored in an IC card by means of load modulation using a high frequency signal, and write information to the IC card.

The reader/writer 34 is controlled by the control unit 31 and, when instructed by the control unit 31 to read information recorded in an ID circuit 54 of the electric vehicle 12 or to write information, generates a read/write instruction signal formed of a high frequency signal of 13.56 MHz (or 2.4 GHz), for example, in the ID circuit 54. The instruction signal is superimposed on a power supply line 40a as a high frequency signal through the high-pass filter 35 and transmitted to the electric vehicle 12. Furthermore, the instruction signal is supplied to the electric vehicle 12 through a power supply line 55a from a plug 55 connected to the outlet 40 through the power supply line 40a. In the electric vehicle 12, the instruction signal is supplied to the ID circuit 54 by a high-pass filter 53 through the power supply line 55a. The ID circuit 54 reads or writes information by means of the load modulation using the high frequency signal. The ID circuit 54 is formed of an IC chip such as Felica (registered trademark), MIFARE (registered trademark), or RFID (registered trademark). On the basis of the instruction signal including the high frequency signal, the ID circuit 54 receives the supply of operating power and reads the vehicle ID stored in itself or writes and stores the information as instructed. Note that in this case, the instruction signal including the high frequency signal in the electric vehicle 12 does not pass toward the side of a battery 52 because a low-pass filter 51 is provided. In other words, the low-pass filter 51 functions as a blocking filter in this case.

The power meter 38 measures the amount of electric power supplied from a commercial power supply 16 that is an AC power supply of 50 Hz or 60 Hz and 100 V, for example, and supplies the information on the measured amount of electric power to the control unit 31. The selector switch 37 is controlled by the control unit 31 and, when controlled to be turned on, superimposes the electric power supplied from the commercial power supply 16 through the power meter 38 on the power supply line 40a through the low-pass filter 36 so that the power is output. The electric power supplied to the power supply line 40a is supplied through the outlet 40 to the electric vehicle 12 by the plug 55 connected to the outlet 40. In the electric vehicle 12, the electric power supplied from the power supply line 55a is supplied to the battery 52 by the low-pass filter 51, thereby charging the electric power to be the power source of the electric vehicle 12. Note that the battery 52 includes a battery body which stores power and a configuration which controls the amount of electric power required to charge the battery body by detecting a charge state from an inverter that converts AC power supply to DC power supply and a residual voltage. Accordingly, the battery 52 manages the charge state of the battery body while being charged by receiving the electric power supply and has a function to discontinue supplying the electric power when the battery is fully charged.

The display unit 39 is formed of an LCD (Liquid Crystal Display) or organic EL (Electronic Luminescent) to display various pieces of information and, at the same time, includes a touch panel which accepts various operation information so that the display unit generates an operation signal corresponding to the operation information accepted and supplies the signal to the control unit 31.

[Detailed Configuration of Outlet and Plug]

Next, the detailed configuration of the outlet 40 and the plug 55 will be described with reference to FIG. 2.

The plug 55 includes at a tip thereof two projections 55b whereas the outlet 40 includes two recesses 40b corresponding to the projections 55b, whereby the plug 55 and the outlet 40 are electrically and physically connected to each other when the projection 55b of the plug 55 is inserted to the recess 40b of the outlet 40. The power supply lines 55a and 40a are double lined as illustrated in FIG. 2 to let the AC power supply of the commercial power supply 16 flow.

Figure 2:
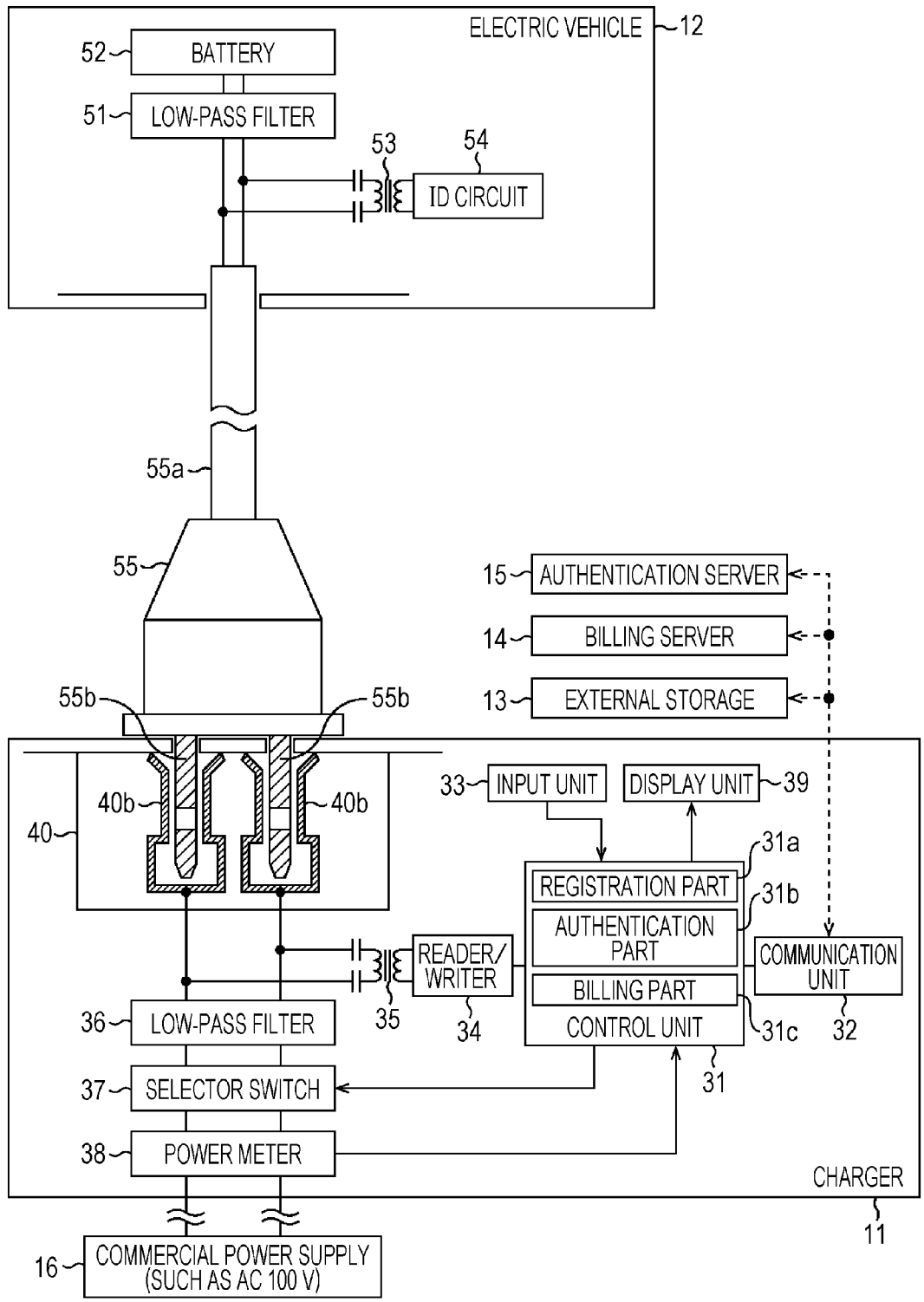
FIG. 2 is a diagram illustrating a configuration example of a plug and an outlet of the power supply system illustrated in FIG. 1.

[Power Supply Process Performed by Charger 11 Illustrated in FIG. 2]

Now, a process of supplying electric power to the electric vehicle 12 by the charger 11 illustrated in FIG. 2 will be described with reference to a flowchart in FIG. 3.

In step S1, the control unit 31 controls the reader/writer 34, communicates with the electric vehicle 12 by executing a communication process with the electric vehicle 12 in order to check whether or not the electric vehicle 12 is connected to the outlet 40 through the plug 55, and reads the vehicle ID of the electric vehicle 12.

[Communication Process]

Figure 4:
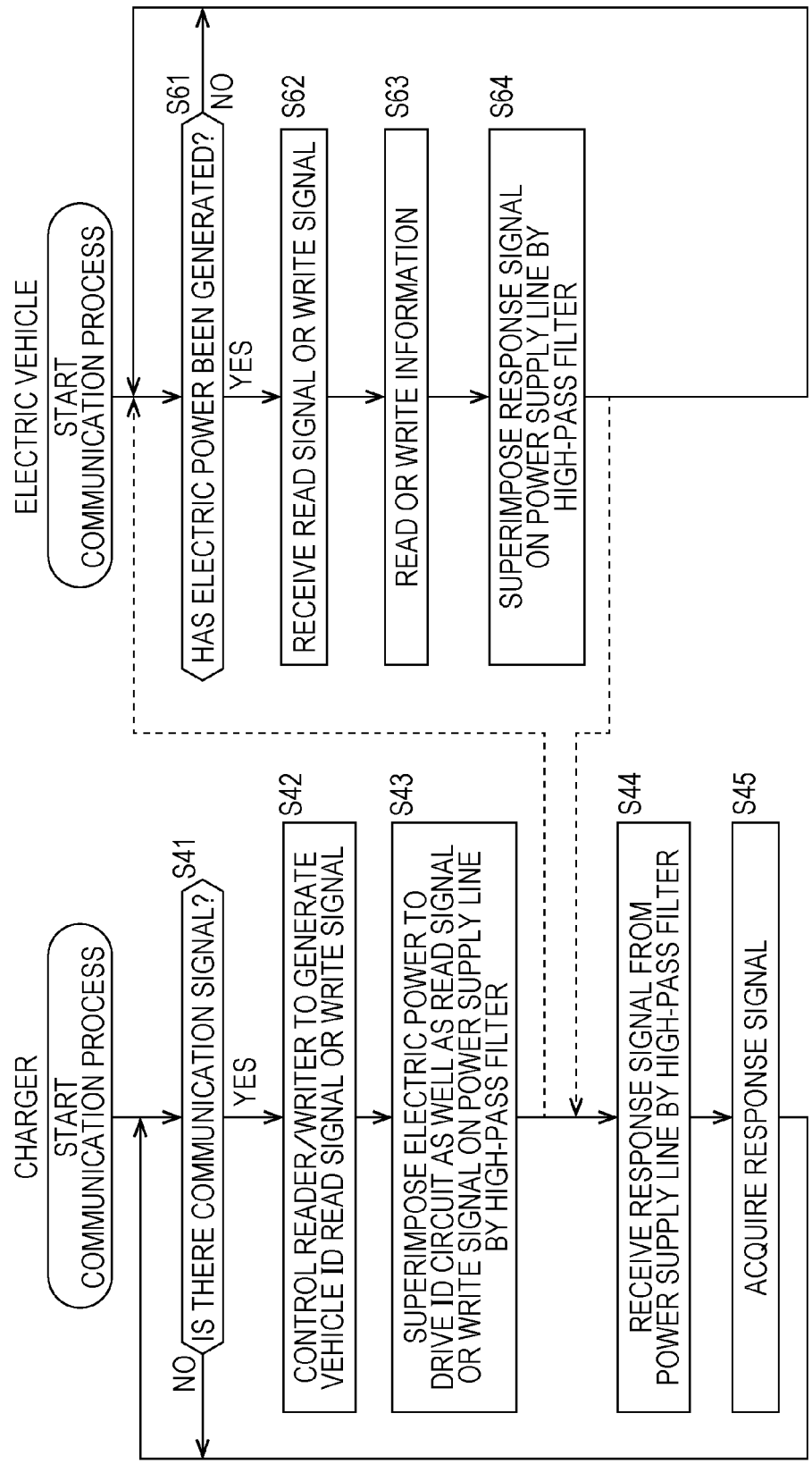
FIG. 4 is a flowchart describing a communication process performed by the power supply system illustrated in FIG. 1.

Here, the communication process performed between the charger 11 and the electric vehicle 12 will be described in detail with reference to a flowchart in FIG. 4.

In step S41, the control unit 31 of the charger 11 controls the reader/writer 34, determines whether or not a communication signal required for communication is generated where communication with the electric vehicle 12 has become necessary, and repeats the similar process until the communication signal is generated. That is, it is regarded that the communication signal is generated when, in step S41, there is a command to read the vehicle ID of the electric vehicle 12 as described in step S1 of the flowchart in FIG. 3, for example. The process proceeds to step S42 in such case.

In step S42, the control unit 31 controls the reader/writer 34 to generate a read signal including a high frequency signal which reads the vehicle ID or a write signal which gives an instruction to write information to be recorded in association with the vehicle ID, and supplies the signal to the high-pass filter 35.

In step S43, the high-pass filter 35 superimposes the high frequency signal generated by the reader/writer 34 on the power supply line 40a and outputs the signal. The high frequency signal is to be a power supply to drive the ID circuit 54 at the same time it is the read signal or the write signal, and is superimposed on the power supply line 40a and output to the outlet 40 in the process.

On the other hand, in the electric vehicle 12, the high-pass filter 53 in step S61 transmits the high frequency signal supplied through the plug 55 and the power supply line 55a, and supplies it to the ID circuit 54. The ID circuit 54 determines whether or not electric power is generated by load modulation on the basis of the high frequency signal supplied. That is, the high frequency signal generated by the reader/writer 34 includes a signal which generates the electric power to drive the ID circuit 54 for a predetermined amount of time from the top, followed by a signal to be a command such as the read signal or the write signal. In reality, it is not determined whether or not the electric power is generated, but an operation is initiated once the electric power is generated. Once the electric power is generated by the top portion of the high frequency signal, the ID circuit 54 stores the generated power and, in response to the command such as the read signal or the write signal subsequently supplied, reads and outputs the information stored in a built-in storage unit in the ID circuit or writes predetermined information into the storage unit by using the stored electric power.

In step S61, the electric power is generated by the high frequency signal supplied through the high-pass filter 53 in the process performed in step S43 when the plug 55 is connected to the outlet 40, for example. The process proceeds to step S62 in such case.

In step S62, the ID circuit 54 acquires the read signal or the write signal supplied along with the high frequency signal.

In step S63, the ID circuit 54 uses the stored electric power to read information from the storage unit or write information thereto in response to the read signal or the write signal acquired. Note that the vehicle ID stored in the ID circuit 54 is read with regards to the process performed in step S1 illustrated in FIG. 3.

In step S64, the ID circuit 54 generates a response signal indicating that writing has been completed when the write signal is acquired or generates the information being read, namely the vehicle ID in this case, as a response signal when the read signal is acquired. Here, the response signal is generated as a signal formed of a high frequency signal. The ID circuit 54 then superimposes the generated response signal formed of the high frequency signal onto the power supply line 55a by the high-pass filter 53, thereby transmitting the response signal to the charger 11 through the plug 55, the outlet 40, and the power supply line 40a.

In step S44, the reader/writer 34 of the charger 11 receives the response signal supplied from the power supply line 40a through the high-pass filter 35.

In step S45, the reader/writer 34 supplies the received response signal to the control unit 31. The control unit 31 therefore acquires the response signal from the electric vehicle 12 that is the electronic device. In other words, the control unit 31 acquires the vehicle ID of the electric vehicle 12 as the response signal when the plug 55 of the electric vehicle 12 is connected to the outlet 40 of the charger 11. When the plug 55 of the electric vehicle 12 is not connected to the outlet 40, on the other hand, the high frequency signal generated by the ID circuit 54 is not superimposed on the power supply line 40a, in which case the reader/writer 34 of the charger 11 receives empty information as the response signal. The control unit 31 receiving the empty response signal cannot acquire the vehicle ID in this case.

Moreover, the ID circuit 54 itself can be operated at a required timing even when the electric vehicle 12 is not started up or when there is no power remaining in the battery of the electric vehicle, because the ID circuit 54 is operated by the electric power obtained by the load modulation. The charger 11 and the ID circuit 54 can therefore communicate with each other even when the electric vehicle 12 is not started up by an operation key (such as an ignition key in a gasoline-powered vehicle) at the time of charging, for example. The description of the operation in the communication process will be omitted hereinafter.

Figure 3:
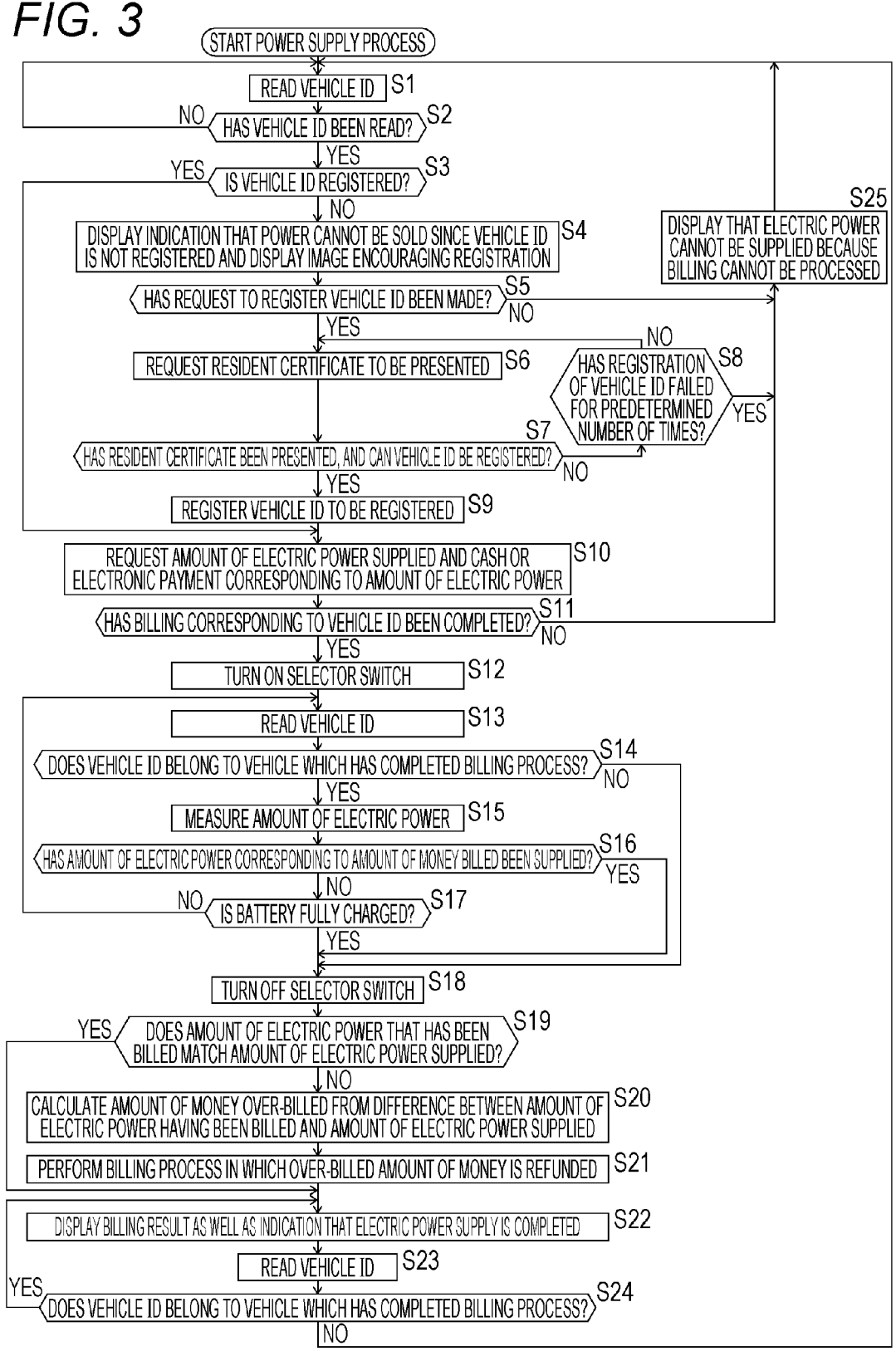
FIG. 3 is a flowchart describing a power supply process performed by the power supply system illustrated in FIG. 1.

The description will now return to the flowchart in FIG. 3.

In step S2, the control unit 31 determines whether or not the vehicle ID has been acquired by the reader/writer 34. That is, as described above, the vehicle ID cannot be read when the plug 55 of the electric vehicle 12 is not connected to the outlet 40 of the charger 11. Accordingly, the process goes back to step S1 when the plug 55 of the electric vehicle 12 is not connected to the outlet 40 of the charger 11 in step S2, and the process in each of steps S1 and S2 is repeated until the plug 55 of the electric vehicle 12 is connected to the outlet 40 of the charger 11. Note that this process may be repeatedly performed at a predetermined time interval as in a polling process since the process is performed to check whether or not the plug 55 of the electric vehicle 12 is connected to the outlet 40 of the charger 11.

The process proceeds to step S3 when the plug 55 of the electric vehicle 12 is connected to the outlet 40 of the charger 11 and the vehicle ID can be read in step S2.

In step S3, the control unit 31 controls the authentication part 31b to determine whether or not the acquired vehicle ID is the registered vehicle ID. The authentication part 31b in this process checks the acquired vehicle ID against the vehicle ID registered in the external storage 13 or the authentication server 15 and authenticates whether or not the acquired vehicle ID is the registered vehicle ID. The process proceeds to step S4 when it is determined in step S3 that the vehicle ID of the electric vehicle 12 is unregistered, for example.

In step S4, the control unit 31 controls the display unit 39 to display that electric power cannot be sold since the vehicle ID is unregistered as well as an image encouraging one to register the vehicle ID.

In step S5, the control unit 31 determines whether or not the display unit 39 formed of the touch panel has been operated to make a request for registering the vehicle ID. The process proceeds to step S6 when the display unit 39 has been operated to make the request for registering the vehicle ID in step S5, for example.

In step S6, the control unit 31 controls the registration part 31a to perform a registration process of the vehicle ID. The registration part 31a then controls the display unit 39 to display an image requesting an owner of the electric vehicle 12 with the vehicle ID being read at the moment to present, to the input unit 33, a resident certificate indicating he/she is a resident of the apartment.

In step S7, the registration part 31a determines whether or not the resident certificate read by the input unit 33 is legitimate, the owner of the electric vehicle 12 resides in the apartment, and the vehicle ID can be registered. The process proceeds to step S8 when it is determined in step S7 that the vehicle ID cannot be registered because the resident certificate is not legitimate or is legitimate but expired, for example.

In step S8, the registration part 31a determines whether or not the number of times it is determined the vehicle ID cannot be registered is within a predetermined number of times. The process goes back to step S6 when the number of times is within the predetermined number of times. That is, the process in steps S6 to S8 is repeated when the number of times it is determined by the presented resident certificate that the vehicle ID cannot be registered is within the predetermined number of times. The process proceeds to step S9 when it is determined in step S7 that the resident certificate is legitimate and that the vehicle ID can be registered.

In step S9, the registration part 31a controls the communication unit 32 to register the presented resident certificate in association with the vehicle ID of the electric vehicle 12 read by the reader/writer 34, into the external storage 13 or the authentication server 15.

On the other hand, the process performed in each of steps S4 to S9 is skipped when it is determined in step S3 that the vehicle ID has already been registered. Once registered, the vehicle ID does not require a registration process in the future.

In step S10, the control unit 31 controls the billing part 31c to execute a required billing process in supplying electric power. In response, the billing part 31c controls the display unit 9 to display an image indicating a request to present, to the input unit 33, cash or electronic money equivalent to the rate corresponding to the amount of electric power supplied. The payment of the rate corresponding to the amount of electric power supplied may be selected from a method including: inserting cash into the input unit 33; holding a card charged with electronic money over the input unit 33; performing the billing process by reading/writing the electronic money charged in the electric vehicle 12 along with the vehicle ID recorded therein by the reader/writer 34 via the power supply line; performing the billing process by reading/writing the electronic money charged in the electric vehicle 12 by the reader/writer 34 via the power supply line after inserting cash into the input unit 33, reading/writing data by the reader/writer 34 via the power supply line, and charging the electronic money in the electric vehicle 12; and billing a user (a resident associated with the vehicle ID) on a monthly basis by saving a use history of the electric power in the external storage. Moreover, the amount of electric power to be charged at the time of charging may be selected from an item presented, including: charging the specified amount of electric power only; charging the electric power equivalent to a predetermined amount of money only; charging for a predetermined period of time only; and charging till the battery is full.

In step S11, the billing part 31c determines whether or not billing for the amount of electric power supplied has been completed. In other words, the billing part 31c determines whether or not the amount of money corresponding to the amount of electric power supplied has been collected in the form of cash, charged money, or electronic money and the billing process itself has been completed. The process proceeds to step S12 when it is determined in step S11 that billing has been completed, for example.

In step S12, the control unit 31 turns on the selector switch 37. The charger 11 starts a charging process as a result and starts to supply the electric power to the electric vehicle 12.

[Charging Process]

Figure 5:
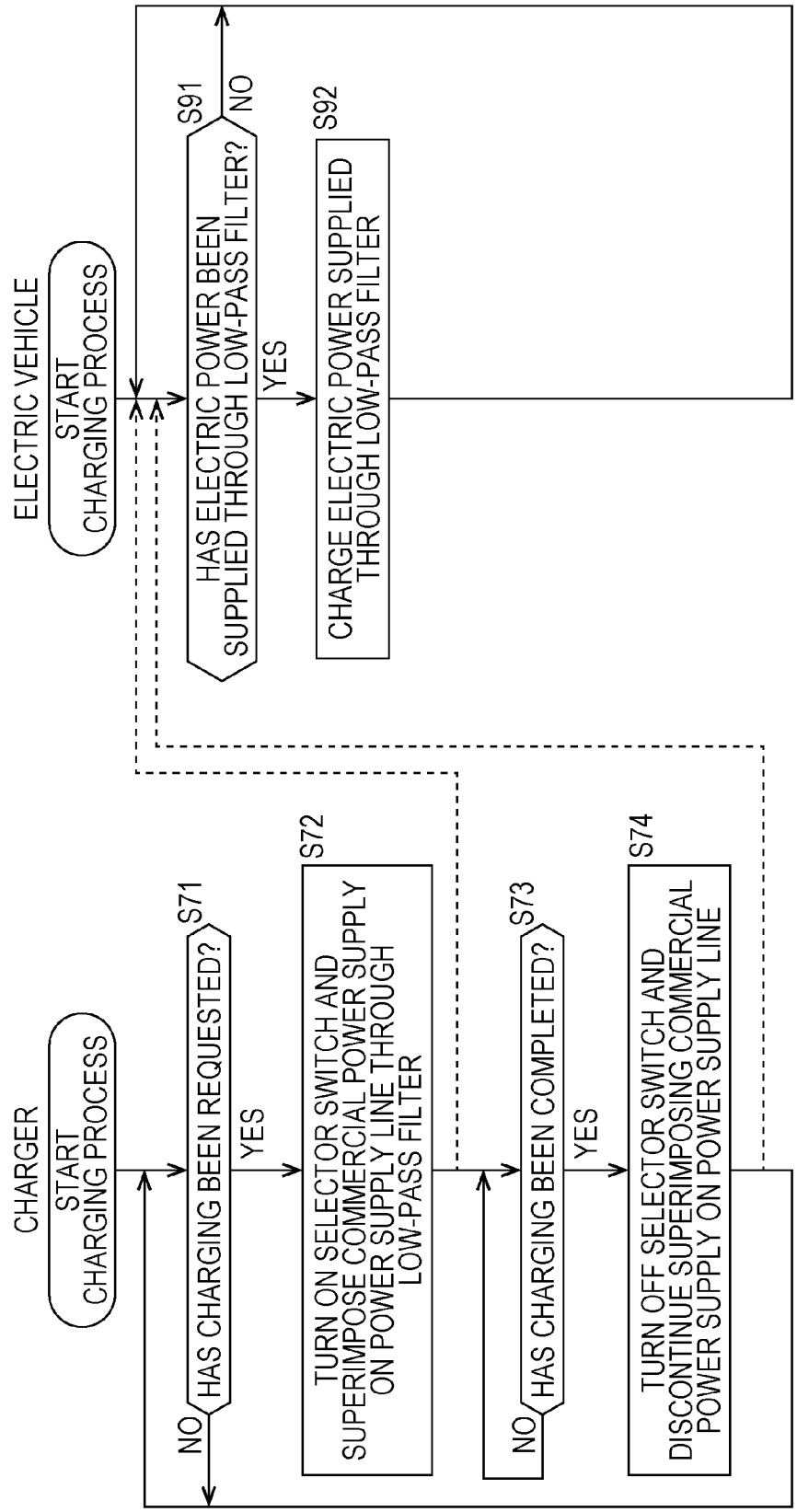
FIG. 5 is a flowchart describing a charging process performed by the power supply system illustrated in FIG. 1.

Here, the charging process performed by the charger 11 and the electric vehicle 12 will be described in detail with reference to a flowchart illustrated in FIG. 5.

In step S71, the control unit 31 determines whether or not there is a request for charging, where the similar process is repeated until charging has been requested. The process proceeds to step S72 when the request for charging has been generated in step S71 upon completing the billing process in the process performed in step S11 of the flowchart illustrated in FIG. 3, for example.

In step S72, the control unit 31 turns on the selector switch 37, superimposes the electric power supplied from the commercial power supply 16 on the power supply line 40a through the low-pass filter 36, and outputs the electric power. Accordingly, the electric power from the commercial power supply 16 is supplied to the power supply line 40a, the outlet 40, the plug 55, and the power supply line 55a.

In step S91, it is determined whether or not the electric power has been supplied through the low-pass filter 51. When the electric power has been supplied in step S91 by the process performed in step S72, for example, the low-pass filter 51 in step S92 passes the electric power to the battery 52, which starts charging. That is, the process in each of steps S91 and S92 is repeated as long as the electric power is supplied to the power supply line 55a, whereby the battery 52 repeats the charging while receiving the supply of electric power.

In step S73, the billing part 31c in the control unit 31 of the charger 11 determines whether or not charging has been completed, where the process in step S73 is repeated until it is determined that charging has been completed. The process proceeds to step S74 when it is determined that charging has been completed. It is determined that charging is completed when, for example, it is assumed in step S14 to be described that a third party has connected a plug 55 of an electric vehicle with a vehicle ID different from that of the electric vehicle 12 that has completed the billing process. It is also determined that charging is completed when the electric power has reached the amount corresponding to the confirmed billing amount in step S16 or when it is assumed in step S17 that the battery is fully charged.

In step S74, the control unit 31 turns off the selector switch 37, whereby the process goes back to step S71. The charging is now completed since this process discontinues the supply of electric power from the commercial power supply 16. According to the aforementioned processes, the electric power from the commercial power supply 16 can be supplied from the charger 11 to the battery 52 of the electric vehicle 12 through the power supply line 40a, the outlet 40, the plug 55, and the power supply line 55a and can charge the battery.

The description will now return to the flowchart in FIG. 3.

In step S13, the control unit 31 controls the reader/writer 34 to transmit a read signal for reading the vehicle ID to the ID circuit 54 of the electric vehicle 12 and read the vehicle ID.

In step S14, the control unit 31 controls the reader/writer 34 to determine whether or not the vehicle ID of the electric vehicle 12 which has completed the billing and is to be charged has been read. This process monitors unauthorized charging that is performed when the plug 55 of another electric vehicle 12 is connected as well as monitors whether or not the plug 55 is securely connected to the outlet 40.

The process proceeds to step S15 when it is assumed in step S14 that the vehicle ID is of the electric vehicle which has been billed.

In step S15, the control unit 31 controls the power meter 38 to measure the amount of electric power that is an integrated value of the electric power supplied from the commercial power supply 16.

In step S16, the control unit 31 determines whether or not the amount of electric power read by the power meter 38 corresponds with the amount of electric power that falls within the amount of money billed by the billing part 31c. The process proceeds to step S17 when it is determined in step S16 that the amount of electric power falls within the amount of money that has been processed and billed, for example.

In step S17, the control unit 31 determines whether or not the battery 52 is fully charged where there is no more change in the amount of electric power read by the power meter 38. That is, the battery 52 monitors the charge state of the battery body and discontinues charging when fully charged, even while receiving the electric power supply. It is thus assumed that charging is discontinued with the battery fully charged, when there is no more change in the amount of electric power read by the power meter 38. The process goes back to step S13 when it is determined in step S17 that the battery is not fully charged, for example. This means that once the selector switch 37 has been turned on in step S12 to start charging, the process in each of steps S13 to S17 is repeated to continue charging until the electric power reaches the amount corresponding to the amount of money that has been billed or until the battery is fully charged unless the plug 55 is pulled out of the outlet 40 or another plug 55 is connected.

The process proceeds to step S18 when it is assumed in step S14 that the vehicle ID is not of the electric vehicle which has completed the billing process, assumed in step S16 that the amount of electric power corresponding to the amount of money billed has been supplied, or assumed in step S17 that the battery is fully charged.

In step S18, the control unit 31 turns off the selector switch 37 to complete the supply of electric power from the commercial power supply 16 to the electric vehicle 12.

In step S19, the control unit 31 determines whether or not the amount of electric power corresponding to the amount of money billed matches the amount of electric power supplied. That is, the process proceeds to step S20 when it is assumed in step S14 that the vehicle ID is not of the electric vehicle which has completed the billing process or assumed in step S17 that the battery has become fully charged before the amount of electric power corresponding to the amount of money billed has been supplied.

In step S20, the control unit 31 controls the billing part 31c to calculate the amount of money that is over-billed from a difference between the amount of electric power corresponding to the amount of money billed and the amount of electric power actually supplied.

In step S21, the control unit 31 controls the billing part 31c to perform a billing process such that the over-billed amount of money is refunded. The billing part 31c controls the communication unit 32 to access the billing server 14 and perform the billing process such that the over-billed amount of money is refunded. That is, when it is assumed in step S14 that the vehicle ID is not of the electric vehicle which has completed the billing process or assumed in step S17 that the battery has become fully charged before the amount of electric power corresponding to the amount of money billed has been supplied, the over-billed amount of money is generated upon discontinuing the supply of electric power before the electric power reaches the amount corresponding to the amount of money billed. The billing process is thus performed to refund the over-billed amount of money. While there has been described an example where the billing process is performed to refund the amount of money that is over-billed, the over-billed amount of money may be appropriated to the next charging time. Moreover, instead of performing the billing process, a prepaid point that has been collected excessively may be returned when the prepaid card or the like is used to make the payment.

On the other hand, the process in steps S20 and S21 is skipped when it is assumed in step S16 that the amount of electric power that has been billed matches the amount of electric power supplied, namely, when it is assumed in step S16 that the amount of electric power, for which the billing process has been completed, has been supplied.

In step S22, the control unit 31 controls the display unit 39 to display a billing result as well as an indication that charging is completed.

In step S23, the control unit 31 controls the reader/writer 34 to read the vehicle ID.

In step S24, the control unit 31 determines whether or not the vehicle ID having been read is the vehicle ID of the vehicle having completed the billing process. The process goes back to step S22 when the vehicle ID having been read is determined to be the vehicle ID of the vehicle having completed the billing process. That is, the charging has already been completed when the vehicle ID is of the vehicle having completed the billing process, whereby the display unit 39 keeps displaying the billing result and the indication that charging is completed until the owner of the electric vehicle 12 pulls the plug 55 out of the outlet 40.

The process goes back to step S1 to repeat the process that follows when it is determined in step S24 that the vehicle ID having been read is not the vehicle ID of the vehicle having completed the billing process or when the vehicle ID cannot be read.

The process proceeds to step S25 when there is no request for registering the vehicle ID in step S5, the registration of the vehicle ID presented has failed for the predetermined number of times or more in step S8, or the billing process has not been performed in association with the vehicle ID in step S11.

In step S25, the control unit 31 controls the display unit 39 to display that electric power cannot be supplied since the billing process cannot be performed.

In the process described above, the only vehicle ID that can be registered is the one provided to the electric vehicle 12 owned by a user who can present in advance the resident certificate provided to the resident of the apartment, whereby anyone who is not the resident of the apartment cannot charge the battery 52 of the electric vehicle 12 used by him/her. By registering the vehicle ID, moreover, one can use the charger 11 without presenting the resident certificate every time he/she uses the charger, thereby increasing convenience. The resident certificate, namely information (contact) of the owner of the electric vehicle 12, is registered in association with the vehicle ID, so that the owner can be notified of the charge state of the electric vehicle (whether charging is completed, the remaining charging time, the estimated time when charging is completed, the amount of electric power supplied, and the billed amount) by an e-mail or the like. Alternatively, the charge state of the electric vehicle can be uploaded on a specific website, which can be viewed only by someone who is authorized by the resident certificate presented. Moreover, the vehicle ID registered in association with the owner is deleted from data registered in the charger 11 when the owner loses the right to receive electric power supply due to cancellation of a resident contract of the apartment, for example. This can prevent the owner from continuously charging the battery 52 of the electric vehicle 12 after losing the right to receive the electric power supply. While there has been described an example where the charger 11 is installed at the apartment, the charger 11 can be installed somewhere other than the apartment, where an ID that replaces the resident certificate is issued to restrict the use of the charger 11 to a user who is registered in a predetermined membership, for example, when it is desired that the charger 11 be used by a limited user.

Furthermore, the electric vehicle 12 with the vehicle ID that is registered once along with the resident certificate presented can be charged in the future as long as the plug 55 is connected to the outlet 40 and the billing process can be executed. For example, the billing can always be processed by a credit card with a card number registered in association with the vehicle ID by selecting the credit card as a billing method at the time of registering the vehicle ID, whereby the user of the electric vehicle 12 can repeat billing and charging by simply connecting the plug 55 to the outlet 40. Even when the billing is once completed, if the actual amount of electric power supplied by charging is less than the amount of electric power that can be supplied with the amount of money that has already been billed, the balance is refunded to prevent over-billing. The balance in this case may be allotted to the next time the vehicle is charged without refunding. Moreover, the aforementioned process can prevent electric power from being stolen because the electric power is not supplied when, for example, the plug 55 is pulled out by a third party who then connects a plug 55 of another electric vehicle 12 after the billing process is completed. Furthermore, the aforementioned process can prevent not only the electric power from being stolen but also a loss generated by billing because the charger collects the amount of money only corresponding to the amount of electric power supplied and refunds the over-billed amount generated by the interruption that is caused when the plug 55 is pulled out by the third party.

2. Second Embodiment

Power Supply System in which Electric Power Rate is Billed after Charging

While there has been described an example where the electric power is supplied after connecting the plug 55 to the outlet 40 and completing the billing process, the billing process may instead be performed in accordance with the amount of electric power supplied after the electric power is supplied.

Figure 6:
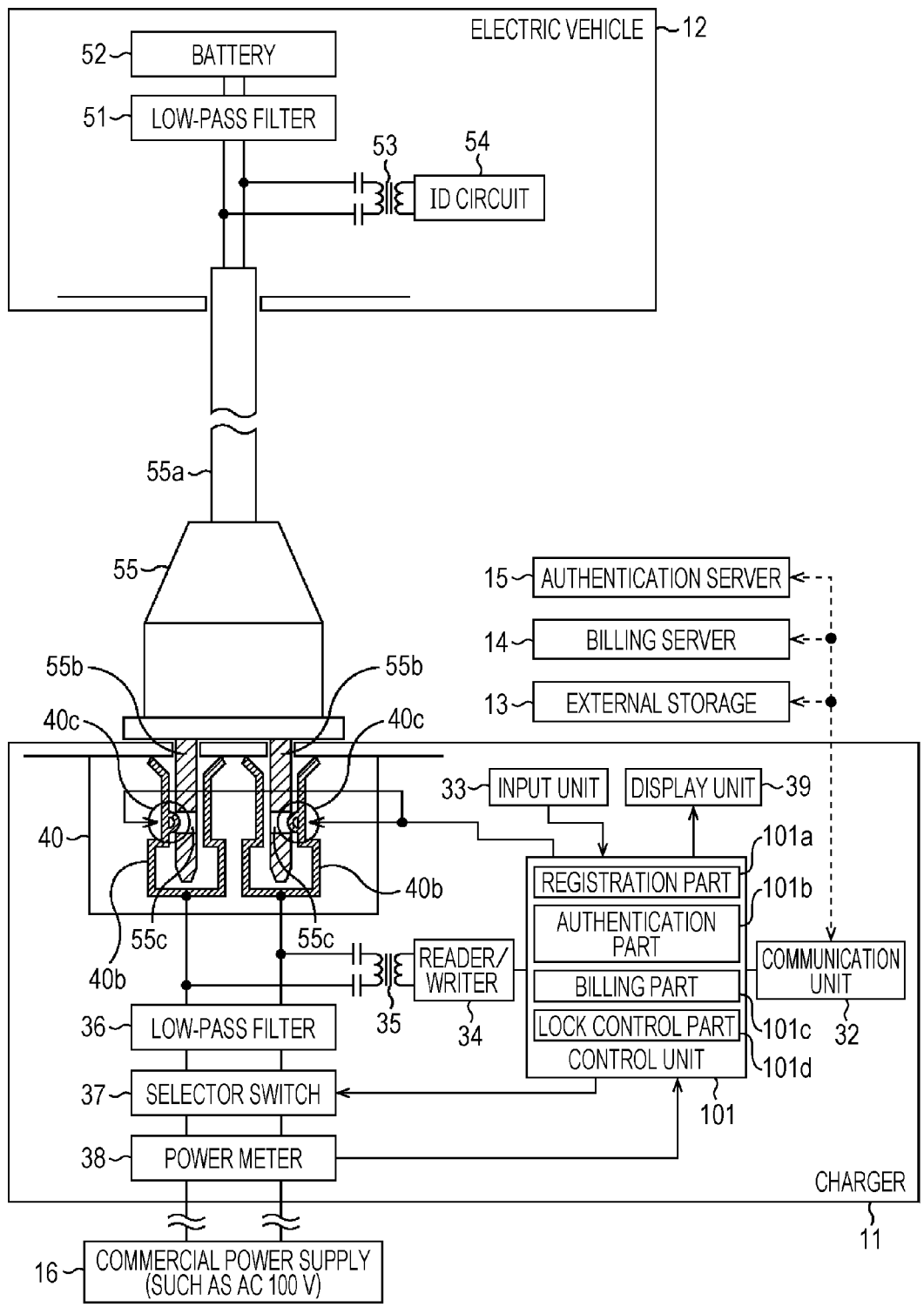
FIG. 6 is a diagram illustrating a configuration example of a second embodiment of the plug and the outlet of the power supply system illustrated in FIG. 1.

FIG. 6 illustrates a configuration example of a power supply system which includes a charger 11 and an electric vehicle 12 and performs a billing process in accordance with the amount of electric power supplied after the electric power is supplied. Note that in the power supply system including the charger 11 and the electric vehicle 12 illustrated in FIG. 6, the description of a configuration having a function identical to that in the power supply system illustrated in FIG. 2 will be omitted as appropriate by assigning the same name and the same reference numeral to the configuration.

What is different from the power supply system illustrated in FIG. 2 in the power supply system illustrated in FIG. 6 is that a projected lock 40c which can be inserted to a hole 55c in a projection 55b of a plug 55 is provided in an outlet 40 of the charger 11 and that a control unit 101 having a function to control the lock 40c is provided in place of the control unit 31.

The lock 40c has a projected shape with the diameter substantially equal to that of the hole 55c in the projection 55b of the plug 55 and can be operated to be inserted to the hole 55c of the plug 55. The plug 55 cannot be pulled out of a recess 40b of the outlet 40 when the lock 40c is inserted to the hole 55c as illustrated in FIG. 6, for example, because the lock 40c is fitted to the hole 55c. The plug 55 can be pulled out of the recess 40b of the outlet 40 when the lock 40c is removed from the hole 55c because the hole 55c is released from the lock 40c fitted thereto.

The fundamental function of the control unit 101 is similar to that of the control unit 31. That is, a registration part 101a, an authentication part 101b and a billing part 101c each has a function that is fundamentally similar to the function of the registration part 31a, the authentication part 31b, and the billing part 31c, respectively. A lock control part 101d controls the aforementioned lock 40c to be projected inside the recess 40b of the outlet 40 so that the lock 40c is fitted to the hole 55c of the inserted plug 55 and that the plug 55 cannot be pulled out of the outlet 40. Moreover, the lock control part 101d controls the lock 40c to be pulled out of the recess 40b of the outlet 40 so that the hole 55c in the inserted plug 55 is released from the lock 40c fitted thereto and that the plug 55 can be pulled out of the outlet 40.

Note that in this example, an input unit 33 accepts a predetermined amount of cash in advance while the plug 55 is inserted to the outlet 40, and a prepaid point corresponding to the accepted amount of cash is recorded in association with a vehicle ID into an ID circuit 54 by a reader/writer 34, whereby a billing process is performed by using the prepaid point recorded. More specifically, the input unit 33 accepts cash or the like in advance while the plug 55 is inserted to the outlet 40 and the prepaid point can be read, for example, and the billing part 101c controls the reader/writer 34 to record the prepaid point into the ID circuit 54. Information on the prepaid point is updated in accordance with the payment of the electric power rate.

The prepaid point need not be managed in the ID circuit 54. For example, the billing part 101c may control the reader/writer 34 so that the prepaid point may be registered in a billing server 14 through a communication unit 32 in association with the vehicle ID being read while the plug 55 is inserted to the outlet 40. The billing may also be processed by cash or a credit card.

[Power Supply Process Performed by Charger 11 in FIG. 6]

Figure 7:
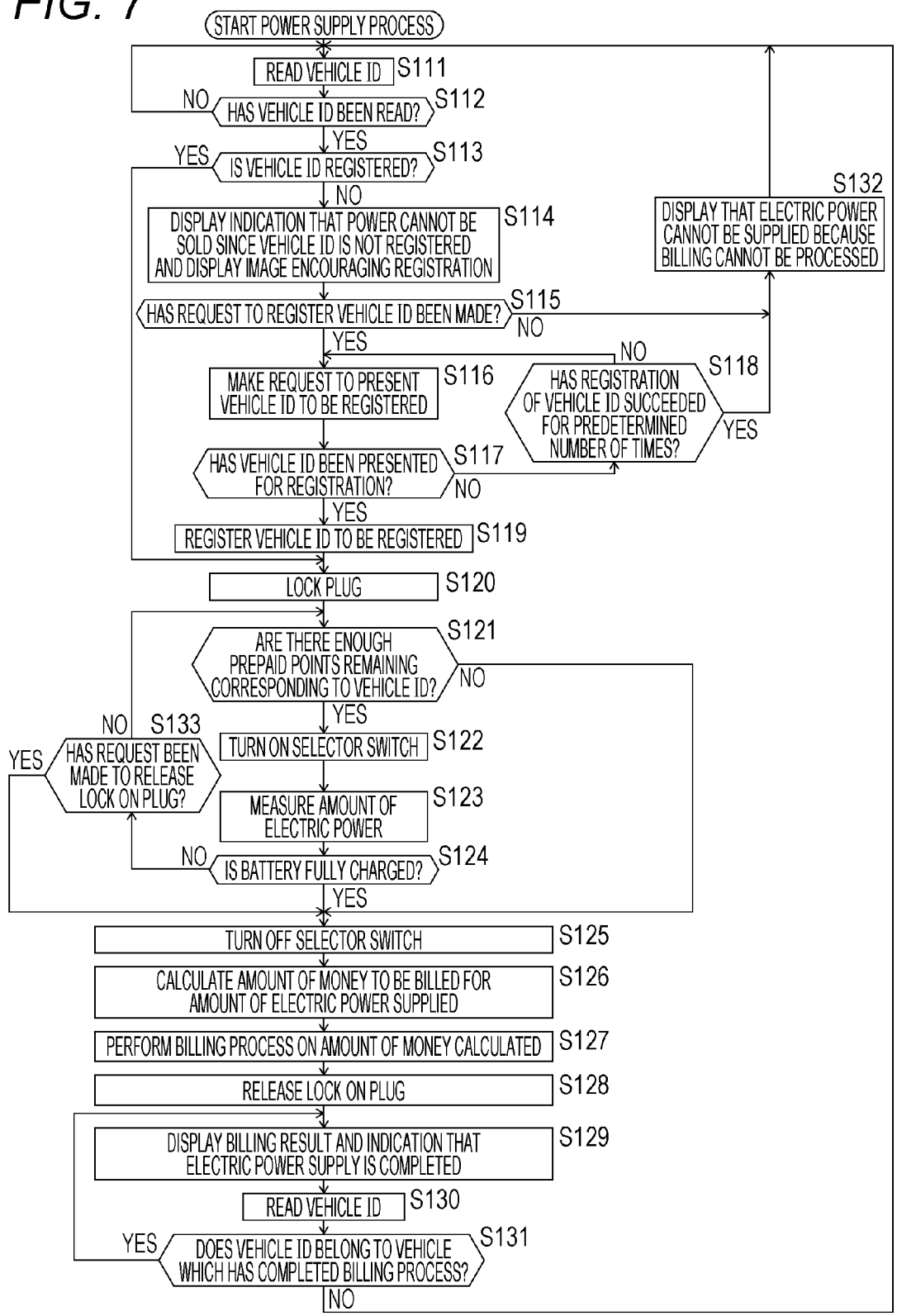
FIG. 7 is a flowchart describing a power supply process performed by the power supply system illustrated in FIG. 6.

Now, a power supply process performed by the charger 11 illustrated in FIG. 6 will be described with reference to a flowchart in FIG. 7. The description of a process performed in each of steps S111 to S119 and steps S129 to S132 of the flowchart illustrated in FIG. 7 will be omitted here since the process is similar to that performed in steps S1 to S9 and steps S22 to S25 of the flowchart illustrated in FIG. 3, respectively. Moreover, the description of the communication process and the charging process will be omitted since the processes are similar to those described with reference to the flowchart illustrated in each of FIGS. 4 and 5.

That is, the process proceeds to step S120 when the vehicle ID has been read or registered by the process performed in steps S111 to S119. In step S120, the lock control part 101d of the control unit 101 controls the lock 40c to be projected inside the recess 40b of the outlet 40. As a result, the lock 40c is inserted to the hole 55c in the projection 55b of the plug 55 so that the plug 55 is locked in the outlet 40 and cannot be pulled out.

In step S121, the billing part 101c controls the reader/writer 34 to acquire the prepaid point recorded in association with the vehicle ID in the ID circuit 54 and determines whether or not there are enough prepaid points remaining to supply electric power. The process proceeds to step S122 when it is determined in step S121 that there are enough prepaid points remaining. The enough prepaid points here may correspond to the amount of electric power required to fully charge the battery from the charge capacity that is near empty. Moreover, a configuration which measures the residual voltage of a battery 52 may be provided to calculate, as a rough estimate, the amount of electric power required to fully charge the battery from the residual voltage and the number of prepaid points required, which may be considered as the enough prepaid points.

In step S122, the control unit 101 controls a selector switch 37 to be turned on. Accordingly, the charging process is initiated by the charger 11 which starts supplying electric power to the electric vehicle 12.

In step S123, the control unit 101 controls a power meter 38 to measure the amount of electric power that is an integrated value of the electric power supplied from a commercial power supply 16.

In step S124, the control unit 101 determines whether or not the battery 52 is fully charged where there is no more change in the amount of electric power read by the power meter 38. The process proceeds to step S133 when it is determined in step S124 that the battery is not fully charged, for example.

In step S133, the control unit 101 determines whether or not a display unit 39 formed of a touch panel has been operated to request that the plug 55 locked by the lock 40c is released from a locked state. The process goes back to step S121 when it is determined in step S133 that there is no request to release the locked state. That is, once the plug 55 is locked in the outlet 40 by the process performed in step S120, the process performed in each of steps S121 to S124 and S133 is repeated to continue charging until the battery is fully charged or the request to release the lock is made, as long as there are enough prepaid points remaining. At this time, the amount of electric power increases with time when the charging continues while measuring the amount of electric power, thereby increasing the number of prepaid points required for payout as a result. This sometimes causes a situation where, at some point as the charging continues after the charger has started charging with a small number of prepaid points, it is determined in the process performed in step S121 that there are not enough prepaid points remaining to fully charge the battery. The process proceeds to step S125 in this case.

The process also proceeds to step S125 when it is determined in step S124 that the battery is fully charged or when it is determined in step S133 that there has been a request to release the lock in the plug 55.

In step S125, the control unit 101 controls the selector switch 37 to be turned off and terminates the electric power supplied from the commercial power supply 16 to the electric vehicle 12.

In step S126, the control unit 101 controls the billing part 101c to calculate the corresponding electric power rate, assuming the amount of electric power read by the power meter 38 at the end as the total amount of electric power supplied.

In step S127, the billing part 101c controls the reader/writer 34 to access the ID circuit 54 of the electric vehicle 12, update the prepaid points by subtracting the number of prepaid points corresponding to the calculated electric power rate, and complete the billing process.

In step S128, the control unit 101 controls the lock control part 101d to pull the lock 40c out of the hole 55c in the projection 55b of the plug 55 and release the plug 55 locked in the outlet 40. This process allows the plug 55 to be pulled out of the outlet 40.

The aforementioned process allows a user to receive the supply of electric power used for charging by just inserting the plug 55 of the electric vehicle 12 into the outlet 40 of the charger 11 as long as there are enough prepaid points recorded and remaining in the ID circuit 54. Moreover, the plug 55 can only be pulled out of the outlet 40 after the billing process has been completed, whereby it can be made sure that the billing process is performed. In reality, however, the billing process is performed in a very short time so that charging and the billing process can be completed while the user inserts the plug 55 into the outlet 40 in charging and pulls out the plug after charging as long as there are enough prepaid points recorded and remaining in the ID circuit 54. Furthermore, the battery can be charged with electric power within the amount that can be paid for by the remaining prepaid points even when the prepaid points are not provided enough and run out before the battery is fully charged. As a result, there can be suppressed a case where the electric power is supplied until the battery is full when the prepaid points cannot pay for the bill.

Described above is an example where the control unit 101 recognizes the request to release the locked state of the plug 55 when the display unit 39 formed of the touch panel is operated in step S133 to request that the plug 55 is released from the state locked by the lock 40c. Alternatively, as long as the request to release the locked state of the plug 55 can be recognized, the request to release the locked state of the plug 55 may be recognized by a sensor detecting that the plug 55 is turned in a pull-out direction where, for example, the recess 40b of the outlet 40 is configured such that the plug 55 being inserted is turned in a predetermined direction, and the sensor is provided to recognize the turning state of the plug.

3. First Variation

Power Supply System in which Non-Contact ID Card is Used

Described above is an example where the ID circuit 54 is provided in the electric vehicle 12 so that the vehicle ID and the prepaid points stored in the ID circuit 54 are used. When the electric vehicle 12 is a rental car or the like, however, the aforementioned configuration possibly causes a case where the user who has rented the rental car cannot pay for the electric power supplied because the vehicle ID of only the rental car vendor can be stored. Now, a personal ID in the form of a non-contact IC card such as Felica may be substituted for the ID circuit 54 so that every user of the electric vehicle 12 can be billed for charging.

Figure 8:
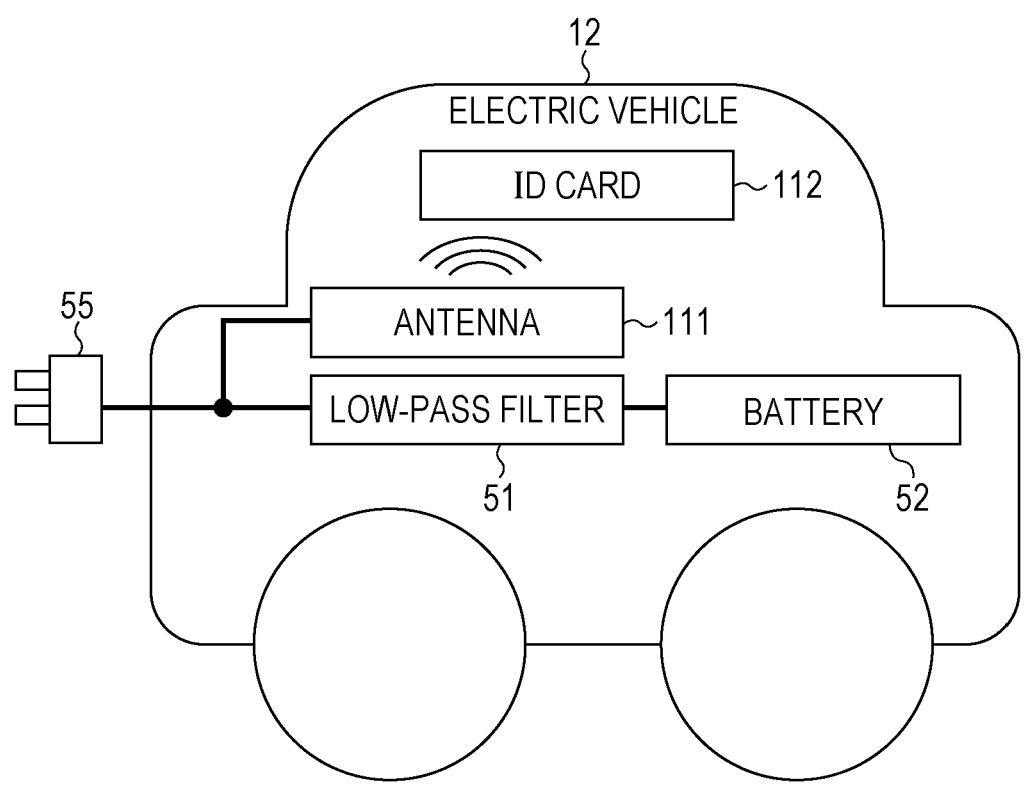
FIG. 8 is a diagram illustrating a configuration example of an electric vehicle according to a first variation of an electric vehicle.

FIG. 8 illustrates a configuration example of an electric vehicle 12 in which a personal ID and a prepaid point are used by using an ID card 112 formed of a non-contact IC card or the like. The description of a configuration in FIG. 8 which has a function identical to that of the configuration of the electric vehicle 12 in FIG. 1 will be omitted as appropriate by assigning the same name and the same reference numeral to the configuration. What is different from the electric vehicle 12 illustrated in FIG. 1 in the electric vehicle 12 illustrated in FIG. 8 is that an antenna 111 and the ID card 112 are provided in place of the high-pass filter 53 and the ID circuit 54.

The antenna 111 generates a radio wave with a frequency corresponding to a high frequency signal. The ID card 112 is an IC card which includes an IC chip such as Felica (registered trademark) and realizes non-contact communication, and performs communication by the radio wave generated by the antenna 111 and including the high frequency signal of 13.56 MHz (or 2.4 GHz) as well as operates with the supply of electric power. The ID card 112 further reads information on the personal ID stored in the IC chip built in the own ID card as well as reads or writes information on the prepaid points.

[Communication Process Performed by Electric Vehicle in FIG. 8]

Figure 9:
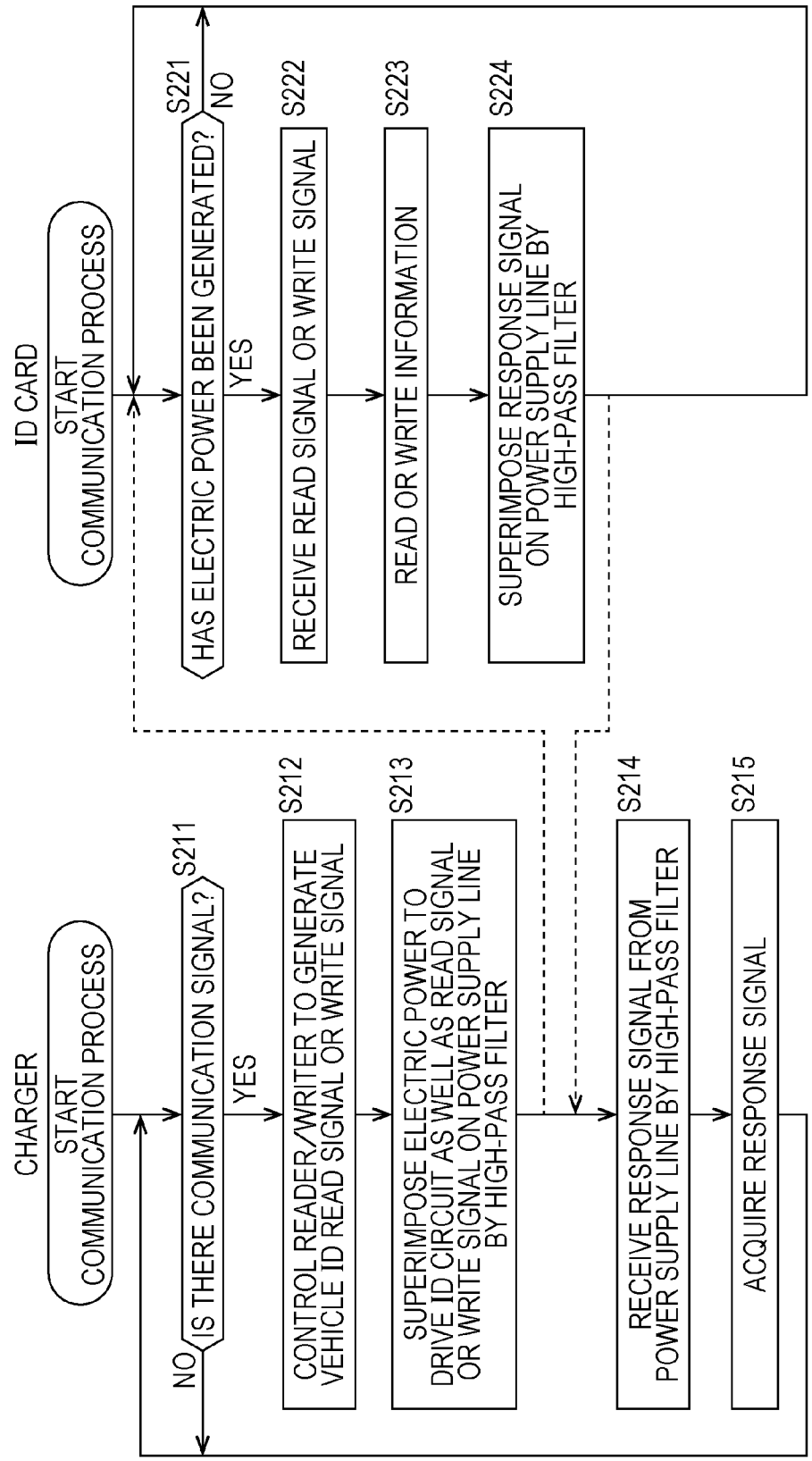
FIG. 9 is a flowchart describing a communication process performed by the power supply system including the electric vehicle illustrated in FIG. 8.

Now, a communication process performed by the ID card 112 of the electric vehicle 12 in FIG. 8 and the charger 11 in FIG. 1 will be described with reference to a flowchart illustrated in FIG. 9. Note that the description of the process performed by the charger 11 in the flowchart illustrated in FIG. 9 will be omitted since the process is similar to the process described with reference to FIG. 4 where the vehicle ID is replaced by the personal ID.

That is, in the process performed in each of steps S211 to S213, a read signal or a write signal formed of a high frequency signal is superimposed on the power supply line 40a, the outlet 40, the plug 55, and the power supply line 55a from the charger 11 and is supplied to the electric vehicle 12. Then in step S221, the ID card 112 determines whether or not electric power is generated by the load modulation through the antenna 111 and repeats the similar process until electric power is generated. The process proceeds to step S222 while the IC card 112 stores the electric power, when it is determined in step S221 that the electric power is generated by the load modulation by a top signal of the high frequency signal supplied as a result of the process performed in step S213.

In step S222, the IC card 112 uses the stored electric power to receive the read signal or the write signal that is subsequently transmitted.

In step S223, the IC card 112 reads, on the basis of the read signal, the information such as the personal ID or the prepaid points stored in the own card or stores the transmitted information in the own card on the basis of the write signal.

In step S224, the IC card 112 transmits the information of the personal ID or the prepaid points having been read as a response signal. Alternatively, the IC card 112 transmits the information indicating that the prepaid point has been written as a response signal. The antenna 111 at this time receives the response signal, superimposes the signal on the power supply line 55a, the plug 55, the outlet 40, and the power supply line 40a as a high frequency signal, and supplies it to the electric vehicle 12.

In response, a reader/writer 34 of the electric vehicle 12 receives the response signal from the power supply line 40a and supplies it to a control unit 31 (101) in steps S214 and S215. The control unit 31 (101) thereafter acquires the response signal from the IC card 112.

According to the aforementioned process, the billing process pertaining to charging can be implemented for each user by managing the personal ID in the IC card 112 for every user of the electric vehicle 12 and using the personal ID in place of the vehicle ID described above. Note that the description of the charging process performed in the power supply system illustrated in FIG. 8 will be omitted since it is similar to the charging process performed in the power supply system illustrated in FIG. 1.

4. Second Variation

Power Supply System in which Plug Adapter is Used

There has been described the configuration example of the power supply system which is configured by directly connecting the charger 11 and the electric vehicle 12. However, it has been unable to charge the battery 52 of the electric vehicle 12 by using the aforementioned power supply system when the electric vehicle 12 does not include a configuration which is incorporated in the electric vehicle in advance to identify an electric vehicle to be charged by the reader/writer 34 formed of the IC chip storing the vehicle ID or the personal ID. Now, between the charger 11 and the electric vehicle 12, a configuration which can identify the electric vehicle 12 to be charged by the reader/writer 34 formed of the IC chip storing the vehicle ID or the personal ID may be configured as a plug adapter, so that the battery 52 of the electric vehicle 12 connected through the plug adapter can be charged.

Figure 10:
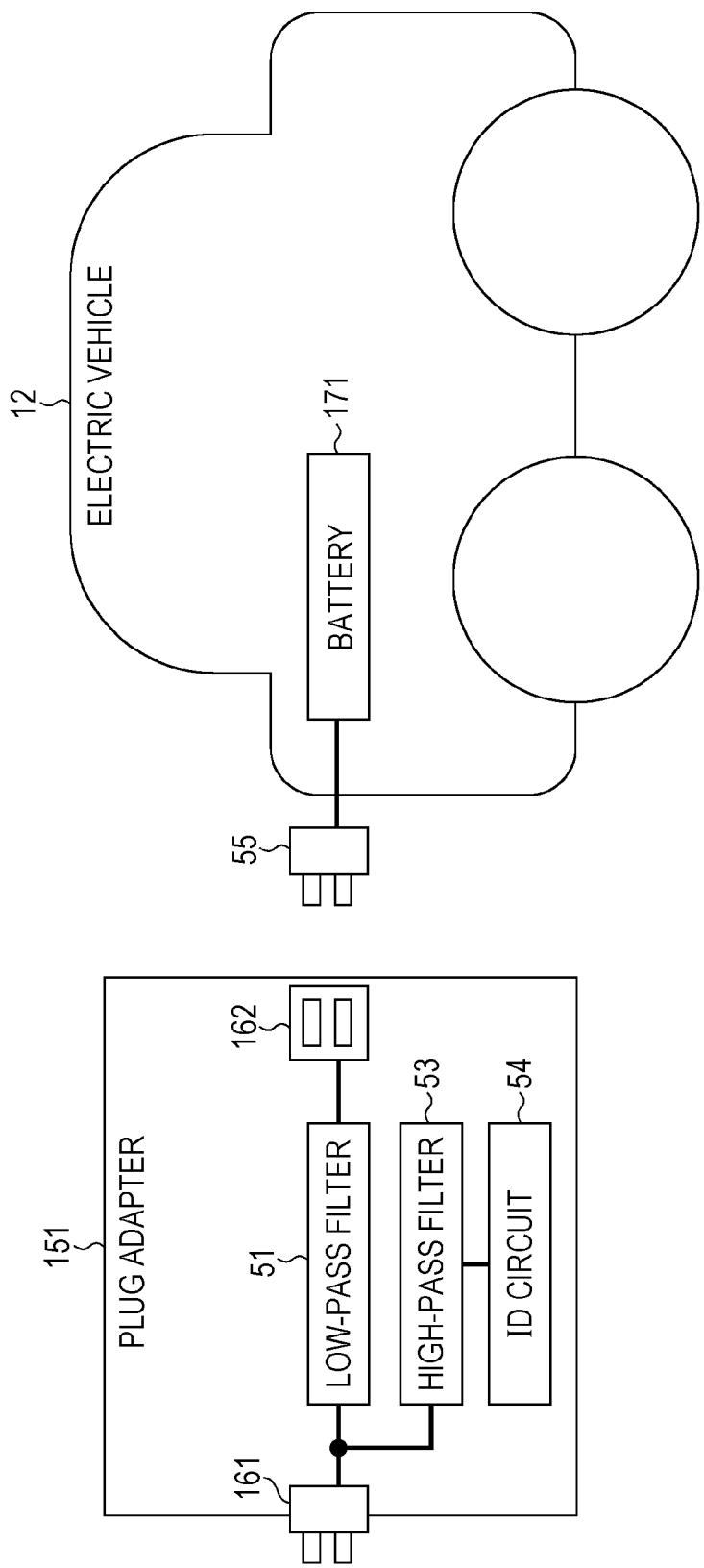
FIG. 10 is a diagram illustrating a configuration example of a second variation of a power supply system including a plug adapter.

FIG. 10 illustrates a configuration example where the charger 11 can charge the electric vehicle while specifying the electric vehicle 12 to be charged by using the plug adapter. In FIG. 10, the description of a configuration which has a function identical to that of the charger 11 and the electric vehicle 12 in FIG. 1 will be omitted as appropriate by assigning the same name and the same reference numeral to the configuration. What is different from FIG. 1 is that in FIG. 10, an electric vehicle 12 including a plug adapter 151 including a low-pass filter 51, a high-pass filter 53, and an ID circuit 54 as well as a conventional battery 171 not including the low-pass filter 51, the high-pass filter 53, and the ID circuit 54 is provided. Note that the description of the configuration of the charger 11 will be omitted since the configuration is similar to that of the charger in FIG. 1.

The plug adapter 151 includes a plug 161, an outlet 162, the low-pass filter 51, the high-pass filter 53, and the ID circuit 54. The plug 161 is connected to the outlet 40 of the charger 11 whereas the outlet 162 is connected to the plug 55 of the electric vehicle 12. In other words, the plug adapter 151 has the configuration in which only the low-pass filter 51, the high-pass filter 53, and the ID circuit 54 are picked out from the configuration of the electric vehicle 12 illustrated in FIG. 1. Accordingly, a power supply system has the function similar to that of the power supply system illustrated in FIG. 1 by connecting the plug adapter between the charger 11 and the electric vehicle 12 which does not include these configurations.

[Charging Process Performed in Power Supply System in FIG. 10]

Figure 11:
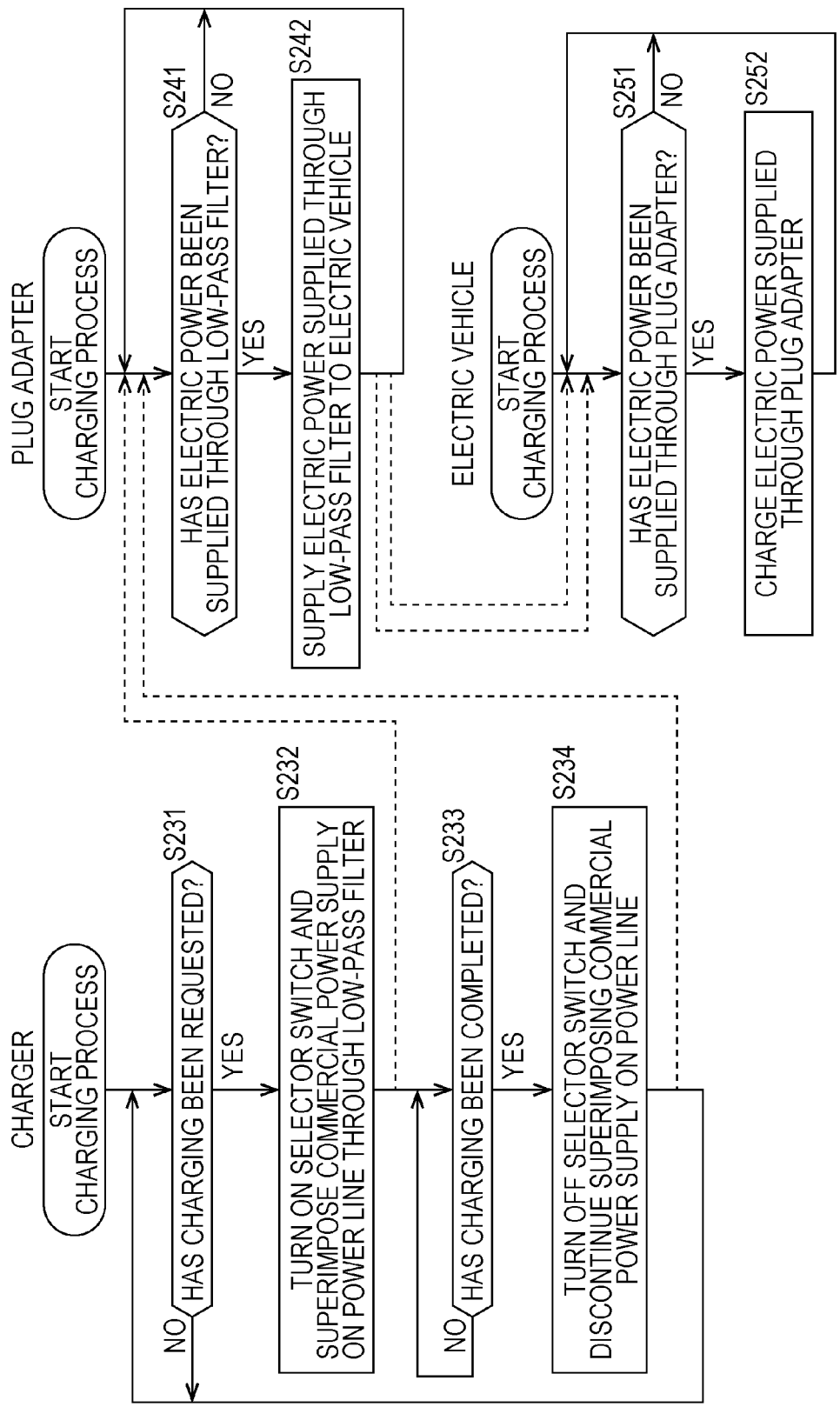
FIG. 11 is a flowchart describing a charging process performed by the power supply system including the plug adapter illustrated in FIG. 10.

Now, a charging process performed in the power supply system illustrated in FIG. 10 will be described with reference to a flowchart in FIG. 11. Note that the description of the process performed by the charger in each of steps S231 to S234 of the flowchart in FIG. 11 will be omitted since the process is similar to that in FIG. 5.

That is, electric power is supplied from the outlet 40 through the plug 161 by the process performed in each of steps S231 and S232. In step S241, it is determined whether or not electric power has been supplied through the low-pass filter 51. In step S242, the low-pass filter 51 distributes the electric power to the electric vehicle 12 through the outlet 162 when it is determined in step S241 that the electric power has been supplied by the process performed in step S232, for example.

On the basis of whether or not the electric power has been supplied through the plug 55 in step S251, the electric power is supplied to the battery 171 through the plug 55 connected to the outlet 162 to which the electric power has been distributed by the process performed in step S242, for example, whereby the battery 171 starts charging. In other words, the battery 171 receives the electric power supply and continues charging while the process performed in each of steps S251 and S252 is repeated as long as the electric power is supplied from the plug adapter 151 through the power supply line 55a.

Having been determined in step S233 that the supply of electric power has been completed, the selector switch 37 is turned off so that the electric power supplied from the commercial power supply 16 is discontinued in step S234. Accordingly, the process performed in step S241 is repeated in the plug adapter 151, whereby the electric power supplied to the battery 171 through the outlet 162 and the plug 55 is discontinued. The electric power not being supplied to the battery 171, the process performed in step S251 is repeated so that the battery 171 is not charged anymore.

While the power supply system including the charger 11 and the electric vehicle 12 has been described, the system may include an apparatus which supplies electric power and an apparatus which receives electric power supply to be configured satisfactorily. Therefore, the apparatus which supplies electric power may not only be a charger which supplies electric power for the purpose of charging but a power supply apparatus which supplies electric power to a home appliance, for example. The apparatus which receives electric power supply may not only be an electric vehicle but a general home appliance. Accordingly, the aforementioned power supply system may include the power supply apparatus and the home appliance, for example.

Where a power supply (an outlet) is provided in a restaurant, for example, electric power is sometimes unduly used by a customer who has come to the restaurant and charges a mobile phone or the like while unobserved by a clerk. By using the aforementioned power supply system, however, an induction heating cooker or the like used at a restaurant can receive electric power supply when used together with the plug adapter 151 or the like which is owned by the restaurant and includes something equivalent to the ID circuit 54. On the other hand, a customer who has come to the restaurant cannot charge a mobile phone or the like while, say, unobserved by a clerk because the plug adapter 151 needs to be used in order to receive electric power supply from the outlet. The undue use of electric power as described above can be prevented as a result.

The aforementioned process allows the electric power to be supplied to the battery 171 and charge it by the charger 11 included in the aforementioned power supply system even when the electric vehicle 12 does not include the low-pass filter 51, the high-pass filter 53, and the ID circuit 54 that are provided conventionally.

The series of processes described above can be executed by either hardware or software. When the series of processes is executed by the software, a program configuring the software is installed from a recording medium to a computer that is incorporated in dedicated hardware or to a general-purpose personal computer or the like that is capable of executing various functions by installing various programs.

FIG. 12 illustrates a configuration example of a general-purpose personal computer. The personal computer has a built-in CPU (Central Processing Unit) 1001. The CPU 1001 is connected to an input/output interface 1005 through a bus 1004. A ROM (Read Only Memory) 1002 and a RAM (Random Access Memory) 1003 are connected to the bus 1004.

Connected to the input/output interface 1005 are: an input unit 1006 formed of an input device such as a keyboard and a mouse through which a user inputs a control command; an output unit 1007 which outputs an image of a process operation screen or process result to a display device; a storage unit 1008 formed of a hard disk or the like in which a program and various data are stored; and a communication unit 1009 which is formed of a LAN (Local Area Network) adapter or the like and executes a communication process through a network typified by the Internet. Also connected to the input/output interface is a drive 1010 which reads/writes data from/to a removable media 1011 such as a magnetic disc (including a flexible disc), an optical disc (including a CD-ROM (Compact Disc-Read Only Memory) and a DVD (Digital Versatile Disc)), a magneto-optical disc (including an MD (Mini Disc)), or a semiconductor memory.

The CPU 1001 executes various processes according to a program stored in the ROM 1002 or a program which is read from the removable media 1011 such as the magnetic disc, the optical disc, the magneto-optical disc, or the semiconductor memory, installed to the storage unit 1008, and loaded to the RAM 1003 from the storage unit 1008. As deemed appropriate, the RAM 1003 further stores data required for the CPU 1001 to execute various processes.

Note that a step of writing a program recorded in the recording medium herein includes not only a process performed in time series along the order described herein but also a process which is not necessarily performed in time series but performed in parallel or individually.

Note that the present technique may include the following constitutions.

(1) A power supply device including:
a switching unit which turns on/off electric power supplied to a device through a power supply line,
a reader/writer unit which reads a device ID from a storage unit included in the device by means of load modulation using a high frequency signal through the power supply line, or writes information in the storage unit of the device; and
a control unit which performs control to turn on the switching unit and supply electric power to the device through the power supply line when predetermined information has been written in the storage unit of the device by the reader/writer unit or when predetermined information in the storage unit of the device has been read by the reader/writer unit and written in an external storage.

(2) A power supply device including:
a power supply unit which supplies electric power from a commercial power supply to a device through a power supply line;
a switching unit which turns on/off electric power supplied from the power supply unit to the device through the power supply line;
a reader/writer unit which reads a device ID from a storage unit of the device by means of load modulation using a high frequency signal through the power supply line, or writes information into the storage unit of the device; and
a control unit which performs control to turn on the switching unit and supply electric power from the power supply unit to the device through the power supply line when predetermined information has been written in the storage unit of the device read by the reader/writer unit or when predetermined information in the storage unit of the device has been read by the reader/writer unit and written in an external storage.

(3) The power supply device according to (2), wherein the control unit performs control to turn on the switching unit and supply electric power from the power supply unit to the device through the power supply line when billing information corresponding to the electric power supplied has been written in the storage unit of the device by the reader/writer unit or when information required for billing an amount of money corresponding to the electric power supplied has been read from the storage unit of the device by the reader/writer unit and written in the external storage.

(4) The power supply device according to (3), further including a power measurement unit which measures an amount of electric power supplied to the device by the power supply unit, wherein
the control unit performs control to turn off the switching unit and discontinue supplying electric power from the power supply unit to the device through the power supply line when the power measurement unit has measured an amount of electric power corresponding to the billing information for the electric power supplied to the device, the billing information being written by the reader/writer unit.

(5) The power supply device according to (4), wherein the control unit performs control to turn off the switching unit and discontinue supplying electric power from the power supply unit to the device through the power supply line when the device has become fully charged before supplying the amount of electric power corresponding to the billing information for the electric power supplied to the device by the power measurement unit, the billing information being written by the reader/writer unit.

(6) The power supply device according to (5), wherein the control unit performs, at the time of turning off the switching unit and discontinuing the supply of electric power from the power supply unit to the device through the power supply line, a billing process in which the billing information corresponding to the amount of electric power supplied until the device is fully charged is subtracted from billing information that has already been billed so that a balance is refunded, when the device has become fully charged before supplying the amount of electric power corresponding to the billing information for the electric power supplied to the device by the power measurement unit, the billing information being written by the reader/writer unit.

(7) The power supply device according to (6), wherein the reader/writer unit reads, through an antenna connected to the device, the device ID stored in a storage medium in a non-contact manner by means of load modulation using the high frequency signal supplied through the power supply line, or writes information into the storage medium.

(8) The power supply device according to (7), further including an adapter which supplies electric power supplied through the power supply line to the device, wherein the reader/writer unit reads the device ID stored in a storage unit of the adapter connected to the device by means of load modulation using the high frequency signal that is supplied through the power supply line, or writes information into the storage unit of the adapter.

(9) A power supply method including:

a power supply step in which electric power is supplied from a commercial power supply to a device through a power supply line by a power supply unit which supplies electric power from the commercial power supply to the device through the power supply line;

a switching step in which electric power supplied to the device through the power supply line by the process performed in the power supply step is turned on/off by a switching unit which turns on/off electric power supplied from the power supply unit to the device through the power supply line;

a read/write step in which a device ID is read from a storage unit of the device by means of load modulation using a high frequency signal through the power supply line or information is written into the storage unit of the device by a reader/writer unit which reads the device ID from the storage unit of the device by means of load modulation using the high frequency signal through the power supply line or writes the information into the storage unit of the device; and a control step in which control is performed to turn on the process performed in the switching step and supply electric power to the device through the power supply line by the process performed in the power supply step when predetermined information has been written in the device read by the process performed in the read/write step or when predetermined information having been read from the device has been written in an external storage by the process performed in the read/write step, the control step being performed by a control unit which performs control to turn on the switching unit and supply electric power from the power supply unit to the device through the power supply line when the predetermined information has been written in the device read by the reader/writer unit or when the predetermined information having been read from the device has been written in the external storage by the reader/writer unit.

(10) A program which causes a computer to include a step including:

a power supply step in which a power supply unit supplies electric power from a commercial power supply to a device through a power supply line;

a switching step in which a switching unit turns on/off electric power supplied to the device through the power supply line by the process performed in the power supply step;

a read/write step in which a reader/writer unit reads a device ID from a storage unit of the device by means of load modulation using a high frequency signal through the power supply line or writes information into the storage unit of the device; and a control step in which a control unit performs control to turn on the process performed in the switching step and supply electric power to the device through the power supply line by the process performed in the power supply step when predetermined information has been written in the device read by the process performed in the read/write step or when predetermined information having been read from the device has been written in an external storage by the process performed in the read/write step, wherein the computer controls a power supply device including:

the power supply unit which supplies electric power from the commercial power supply to the device through the power supply line;

the switching unit which turns on/off electric power supplied from the power supply unit to the device through the power supply line;

the reader/writer unit which reads the device ID from the storage unit of the device by means of load modulation using the high frequency signal through the power supply line or writes the information into the storage unit of the device; and the control unit which performs control to turn on the switching unit and supply electric power from the power supply unit to the device through the power supply line when the predetermined information has been written in the device read by the reader/writer unit or when the predetermined information having been read from the device has been written in the external storage by the reader/writer unit.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

11 Charger, 12 Electric vehicle, 13 External storage, 14 Billing server, 15 Authentication server, 16 Commercial power supply, 31 Control unit, 31*a* Registration part, 31*b* Authentication part, 31*c* Billing part, 32 Communication unit, 33 Input unit, 34 Reader/writer, 35 High-pass filter, 36 Low-pass filter, 37 Selector switch, 38 Power meter, 39 Display unit, 40 Outlet, 40*a* Power supply line, 40*b* Recess, 41*c* Lock, 51 Low-pass filter, 52 Battery, 53 High-pass filter, 54 ID circuit, 55 Plug, 55*a* Power supply line, 55*b* Projection, 55*c* Hole, 101 Control unit, 101*a* Registration part, 101*b* Authentication part, 101*c* Billing part, 101*d* Lock control part

The invention claimed is:

1. A power supply device, comprising:

a switching unit configured to turn on/off an electric power supplied to a device through a power supply line to charge a battery of the device;

a reader/writer unit configured to read a device ID from a storage unit included in the device and write information in the storage unit of the device, wherein the storage unit is driven by an electronic power generated by load modulation based on a high frequency signal through the power supply line; and a control unit configured to turn on the switching unit and supply the electric power to the device through the power supply line based on information that has been written in the storage unit of the device by the reader/writer unit or based on information in the storage unit of the device that has been read by the reader/writer unit and written in an external storage.

2. A power supply device, comprising:
- a power supply unit configured to supply electric power from a commercial power supply to a device through a power supply line;
- a switching unit configured to turn on/off the electric power supplied from the power supply unit to the device through the power supply line to charge a battery of the device;
- a reader/writer unit configured to read a device ID from a storage unit of the device and write information in the storage unit of the device, wherein the storage unit is driven by an electronic power generated by load modulation based on a high frequency signal through the power supply line; and
- a control unit configured to
  - turn on the switching unit and supply the electric power from the power supply unit to the device through the power supply line based on information that has been written in the storage unit of the device by the reader/writer unit or based on information in the storage unit of the device that has been read by the reader/writer unit and written in an external storage.

3. The power supply device according to claim 2, wherein the control unit is further configured to turn on the switching unit and supply the electric power from the power supply unit to the device through the power supply line based on information that is required to bill the amount of money that corresponds to the electric power supplied has been read from the storage unit of the device by the reader/writer unit and written in the external storage.

4. The power supply device according to claim 2, further comprising a power measurement unit configured to measure an amount of electric power supplied to the device by the power supply unit, wherein
- the control unit is further configured to turn off the switching unit and discontinue supply of the electric power from the power supply unit to the device through the power supply line based on a measurement, by the power measurement unit, of an amount of electric power that corresponds to billing information for the electric power supplied to the device, wherein the billing information is written by the reader/writer unit.

5. The power supply device according to claim 2, wherein the control unit is further configured to turn off the switching unit and discontinue supply of the electric power from the power supply unit to the device through the power supply line based on the device being fully charged before the amount of electric power that corresponds to the billing information, for the electric power supplied to the device by the power measurement unit, is supplied, wherein the billing information is written by the reader/writer unit.

6. The power supply device according to claim 2, wherein the control unit is further configured to control, at the time at which the switching unit is turned off and the supply of the electric power from the power supply unit to the device through the power supply line is discontinued, a billing process in which the billing information that corresponds to the amount of electric power supplied until the device is fully charged is subtracted from billing information that has already been billed so that a balance is refunded, based on the device being fully charged before the amount of electric power that corresponds to the billing information, for the electric power supplied to the device by the power measurement unit, is supplied, wherein the billing information is written by the reader/writer unit.

7. The power supply device according to claim 2, wherein the reader/writer unit is further configured to read, through an antenna connected to the device, the device ID stored in a storage medium in a non-contact manner.

8. The power supply device according to claim 2, further comprising an adapter configured to supply the electric power supplied through the power supply line to the device, wherein
- the reader/writer unit is further configured to read the device ID stored in a storage unit of the adapter connected to the device or write information in the storage unit of the adapter connected to the device, wherein the storage unit is driven by an electronic power generated by the load modulation based on the high frequency signal that is supplied through the power supply line.

9. A power supply method, comprising:
- supplying an electric power from a commercial power supply to a device through a power supply line by a power supply unit;
- turning on/off, by a switching unit, the electric power supplied from the power supply unit to the device through the power supply line for charging a battery of the device;
- reading a device ID from a storage unit of the device and writing information in the storage unit of the device, wherein the storage unit is driven by an electronic power generated by load modulation based on a high frequency signal through the power supply line by a reader/writer unit; and
- controlling, by a control unit, to
  - turn on the switching unit and to supply the electric power from the power supply unit to the device through the power supply line based on the information that has been written in the device read by the reader/writer unit or based on whether the information having been read from the device has been written in the external storage by the reader/writer unit.

10. A non-transitory computer-readable storage medium having stored thereon computer-executable instructions for causing a computer to execute operations, the operations comprising:
- supplying an electric power from a commercial power supply to a device through a power supply line;
- turning on/off, by a switching unit, the electric power supplied to the device through the power supply line to charge a battery of the device;
- reading a device ID from a storage unit of the device and writing information in the storage unit of the device, wherein the storage unit is driven by an electronic power generated by load modulation based on a high frequency signal through the power supply line by a reader/writer unit; and
- controlling to
  - turn on the switching unit and to supply the electric power to the device through the power supply line based on information that has been written in the device read by the reader/writer unit or based on whether the information having been read from the device has been written in an external storage.

* * * * *